US012801055B2

(12) United States Patent
Shimizu et al.

(10) Patent No.: US 12,801,055 B2
(45) Date of Patent: Nov. 17, 2026

(54) TWO-COMPONENT DEVELOPER

(71) Applicant: KYOCERA Document Solutions Inc., Osaka (JP)

(72) Inventors: Tamotsu Shimizu, Osaka (JP); Kohei Terasaki, Osaka (JP); Yuma Uchihashi, Osaka (JP); Yusuke Kurano, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 320 days.

(21) Appl. No.: 18/576,627

(22) PCT Filed: Mar. 31, 2022

(86) PCT No.: PCT/JP2022/016380
§ 371 (c)(1),
(2) Date: Jan. 4, 2024

(87) PCT Pub. No.: WO2023/281882
PCT Pub. Date: Jan. 12, 2023

(65) Prior Publication Data

US 2024/0329555 A1 Oct. 3, 2024

(30) Foreign Application Priority Data

Jul. 9, 2021 (JP) ................................ 2021-114543

(51) Int. Cl.
*G03G 9/113* (2006.01)
*G03G 9/107* (2006.01)

(52) U.S. Cl.
CPC ......... *G03G 9/1139* (2013.01); *G03G 9/1075* (2013.01); *G03G 9/1131* (2013.01); *G03G 9/1136* (2013.01)

(58) Field of Classification Search
CPC .. G03G 9/1139; G03G 9/1075; G03G 9/1131; G03G 9/1136
See application file for complete search history.

(56) References Cited

U.S. PATENT DOCUMENTS 6,054,243 A 4/2000 Yamane et al.
2007/0298339 A1* 12/2007 Kozuru ................ G03G 9/1138
430/111.1

(Continued)

FOREIGN PATENT DOCUMENTS

CN 111722487 A 9/2020
JP H065393 B2 * 1/1994 ........... G03G 9/1139

(Continued)

OTHER PUBLICATIONS

English machine translation of the description of JP-2007033631-A (Year: 2007).*

(Continued)

*Primary Examiner* — Boone Alexander Evans
(74) *Attorney, Agent, or Firm* — Studebaker Brackett PLLC

(57) ABSTRACT

In a two-component developer, external additive particles of toner particles include silica particles. The silica particles have a number average primary particle diameter of at least 30 nm and no greater than 120 nm. Coat layers of carrier particles contain a coating resin and barium titanate particles. The coating resin includes a silicone resin. The barium titanate particles have a number average primary particle diameter of at least 100 and no greater than 500 nm. The barium titanate particles have a content of at least 5 parts by mass and no greater than 45 parts by mass relative to 100 parts by mass of the coating resin. A rate of a mass of the coat layers to a mass of the carrier cores is at least 0.09% by mass and no greater than 4.90% by mass. A (Continued)

coverage rate of the carrier cores is at least 80.0% and less than 100.0%.

8 Claims, 1 Drawing Sheet

(56) References Cited

U.S. PATENT DOCUMENTS

2014/0227638 A1 8/2014 Kishida et al.
2018/0157185 A1* 6/2018 Tsuchihashi ....... G03G 9/09371
2020/0301302 A1 9/2020 Tsurumi et al.

FOREIGN PATENT DOCUMENTS

JP H11-133672 A 5/1999
JP 2002-351145 A 12/2002
JP 2003280284 A * 10/2003
JP 2007033631 A * 2/2007
JP 2014-153652 A 8/2014
JP 2018-142017 A 9/2018
JP 2020-034599 A 3/2020
JP 2020-154225 A 9/2020
JP 2021-081649 A 5/2021

OTHER PUBLICATIONS

English machine translation of the description of JP-H065393-B2 (Year: 1994).*
English machine translation of the description of JP-2003280284-A (Year: 2003).*
"Notice of Reasons for Refusal" Office Action issued in JP 2023-533436; mailed by the Japanese Patent Office on Jan. 28, 2025.

* cited by examiner

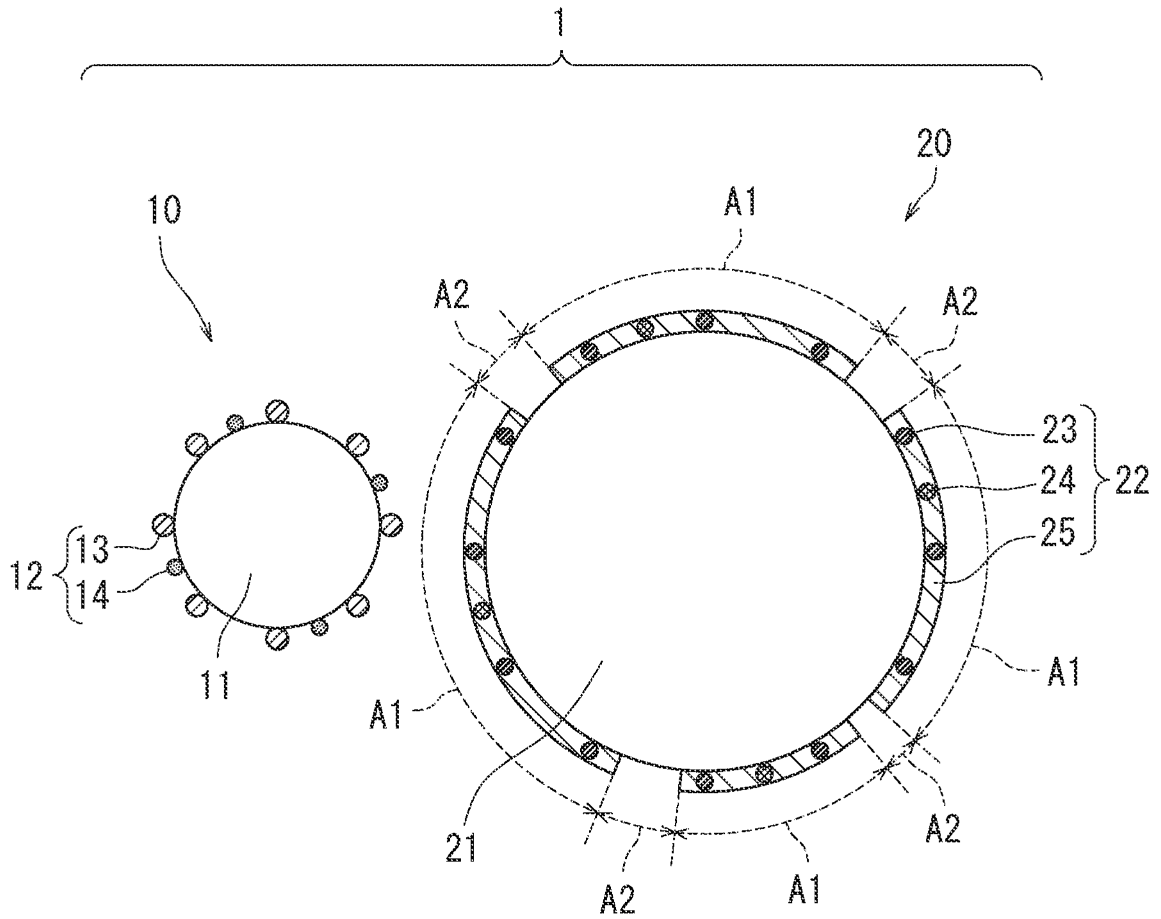
1
10
20
A1
A2
A2
23
24
22
25
12
13
14
11
A1
A1
21
A2
A2
A1

TWO-COMPONENT DEVELOPER

TECHNICAL FIELD

The present invention relates to a two-component developer.

BACKGROUND ART

Image forming apparatuses for forming images with toner are required to stably charge the toner to a desired charge amount in order to stably form images with desired image density. For example, the positively chargeable cyan developer disclosed in Patent Literature 1 contains a toner and a carrier containing core particles and resin coats provided on the surfaces of the core particles in order to inhibit overcharging of the toner. The surfaces of the core particles have a resin coat coverage rate of 60% to 90%.

CITATION LIST

Patent Literature

Patent Literature 1
Japanese Patent Application Laid-Open Publication No. 2002-351145

SUMMARY OF INVENTION

Technical Problem

However, there is room for the positively chargeable cyan developer disclosed in Patent Literature 1 in terms of improvement on fog resistance, stable formation of images with desired image density, and inhibition of the occurrence of carrier development and image defects resulting from cleaning failure.

The present invention has been made in view of the foregoing and has its object of providing a two-component developer that contributes to excellent fog resistance, stable formation of images with desired image density, and inhibition of the occurrence of carrier development and image defects resulting from cleaning failure.

Solution to Problem

A two-component developer according to the present invention contains a toner containing toner particles and a carrier containing carrier particles. The toner particles each include a toner mother particle and external additive particles provided on a surface of the toner mother particle. The external additive particles include silica particles. The silica particles have a number average primary particle diameter of at least 30 nm and no greater than 120 nm. The carrier particles each include a carrier core and a coat layer covering a surface of the carrier core. The coat layers contain a coating resin and barium titanate particles. The coating resin includes a silicone resin. The barium titanate particles have a number average primary particle diameter of at least 100 nm and no greater than 500 nm. The barium titanate particles have a content of at least 5 parts by mass and no greater than 45 parts by mass relative to 100 parts by mass of the coating resin. A rate of a mass of the coat layers to a mass of the carrier cores is at least 0.09% by mass and no greater than 4.90% by mass. A coverage rate of the carrier cores is at least 80.0% and less than 100.0%. The coverage rate is a rate of an area of covered regions of the carrier cores covered with the coat layers to an area of the surfaces of the carrier cores.

Advantageous Effects of Invention

According to the present invention, the two-component developer can contribute to excellent fog resistance, stable formation of images with desired image density, and inhibition of the occurrence of carrier development and image defects resulting from cleaning failure.

BRIEF DESCRIPTION OF DRAWINGS

FIGURE is a diagram illustrating a two-component developer according to an embodiment of the present invention.

DESCRIPTION OF EMBODIMENTS

The meanings of the terms used in the present description and measurement methods are described first. A toner is a collection (e.g., a powder) of toner particles. An external additive is a collection (e.g., a powder) of external additive particles. A carrier is a collection (e.g., a powder) of carrier particles. Unless otherwise stated, evaluation results (values indicating shape or physical properties) for a powder (specific examples include a powder of toner particles, a powder of external additive particles, and a powder of carrier particles) are number averages of values as measured for a suitable number of particles selected from the powder. The "main component" of a material means a component most abundant in the material in terms of mass unless otherwise stated. The level of hydrophobicity (or hydrophilicity) can be expressed by a contact angle of a water droplet (ease of getting wet with water), for example. A lager contact angle of a water droplet indicates a higher level of hydrophobicity. The term "-based" may be appended to the name of a chemical compound in order to form a generic name encompassing both the chemical compound itself and derivatives thereof. When the term "-based" is appended to the name of a chemical compound used in the name of a polymer, the term indicates that a repeating unit of the polymer originates from the chemical compound or a derivative thereof. One type of each component described in the present specification may be used independently, or two or more types of the component may be used in combination.

The volume median diameter ($D_{50}$) of a powder is a median diameter of the powder as measured in terms of volume using a laser diffraction/scattering type particle size distribution analyzer ("LA-950", product of HORIBA, Ltd.) unless otherwise stated. Unless otherwise stated, the number average particle diameter of a powder is a number average value of equivalent circle diameters (Heywood diameters: diameters of circles having the same areas as projected areas of the primary particles) of primary particles of the powder as measured using a scanning electron microscope. The number average primary particle diameter is a number average value of equivalent circle diameters of 100 primary particles, for example. The softening point (Tm) is a value as measured using a capillary rheometer ("CFT-500D", product of Shimadzu Corporation) unless otherwise stated. On an S-shaped curve (vertical axis: temperature, horizontal axis: stroke) as plotted using the capillary rheometer, the softening point corresponds to the temperature corresponding to a stroke value of "(base line stroke value+maximum stroke value)/2". The melting point (Mp) is a temperature at a maximum endothermic peak on an endothermic curve (vertical axis: heat flow (DSC signal), horizontal axis:

temperature) as plotted using a differential scanning calorimeter ("DSC-6220", product of Seiko Instruments Inc.) unless otherwise state. The endothermic peak appears due to melting of the crystallization site. The glass transition point (Tg) is a value as measured in accordance with "Japanese Industrial Standard (JIS) K7121-2012" using a differential scanning calorimeter ("DSC-6220", product of Seiko Instruments Inc.) unless otherwise stated. The glass transition point corresponds to the temperature corresponding to a point of inflection (specifically, an intersection point of an extrapolated baseline and an extrapolated falling line) caused by glass transition on a heat absorption curve (vertical axis: heat flow (DSC signal), horizontal axis: temperature) as plotted using the differential scanning calorimeter. The acid value and hydroxyl value are values as measured in accordance with the "Japanese Industrial Standards (JIS) K0070-1992" unless otherwise stated. The mass average molecular weight (Mw) are values as measured by gel permeation chromatography unless otherwise stated. The charge amount (unit: μC/g) is a value as measured in an environment at a temperature of 25° C. and a relative humidity of 50% using a compact toner draw-off charge measurement system ("MODEL 212HS", product of TREK, INC.) unless otherwise stated. Unless otherwise stated, the level of chargeability is the ease of triboelectric charging to a standard carrier provided by The Imaging Society of Japan. For example, a measurement target is stirred together with a standard carrier (anionicity: N-01, cationicity: P-01) provided by The Imaging Society of Japan to triboelectrically charge the measurement target. The charge amount per unit mass of the measurement target is measured before and after triboelectric charging using for example a Q/m meter ("MODEL 212HS", product of TREK, INC.). A larger change in charge amount per unit mass between before and after triboelectric charging indicates a higher chargeability of the measurement target. The meanings of the terms used in the present description and the measurement methods have been described so far.

[Two-Component Developer]

The following describes a two-component developer (also referred to below as a developer) 1 according to an embodiment of the present invention with reference to FIGURE. FIGURE illustrates the developer 1 according to the present embodiment. Note that a plurality of identical elements are indicated by the same hatching and one of these identical elements is labeled with a reference sign while the other identical elements are indicated with the reference sign omitted.

The developer 1 contains a toner and a carrier. The toner contains toner particles 10. The carrier contains carrier particles 20. The toner particles 10 each include a toner mother particle 11 and external additive particles 12. The external additive particles 12 are provided on the surface of the toner mother particle 11. The external additive particles 12 include silica particles 13. The silica particles 13 have a number average primary particle diameter of at least 30 nm and no greater than 120 nm. The carrier particles 20 each include a carrier core 21 and a coat layer 22. The coat layer 22 covers the surface of the carrier core 21. The coat layers 22 contain a coating resin and barium titanate particles 23. The coating resin includes a silicone resin. The barium titanate particles 23 have a number average primary particle diameter of at least 100 nm and no greater than 500 nm. The barium titanate particles 23 have a content of at least 5 parts by mass and no greater than 45 parts by mass relative to 100 parts by mass of the coating resin. A rate of the mass of the coat layers 22 to the mass of the carrier cores 21 is at least 0.09% by mass and no greater than 4.90% by mass. The coverage rate of the carrier cores 21 is at least 80.0% and less than 100.0%. The coverage rate of the carrier cores 21 is a rate of the area of covered regions A1 of the carrier cores 21 covered with the coat layers 22 to the area of the surfaces of the carrier cores 21.

In the following, the "rate of the mass of the coat layers 22 to the mass of the carrier cores 21" may be referred to as a "coat layer/core rate". The "silica particles 13 having a number average primary particle diameter of at least 30 nm and no greater than 120 nm" may be referred to as "large-diameter silica particles 13".

As a result of having the above features, the developer 1 according to the present embodiment can contribute to excellent fog resistance, form images with desired image density, and inhibit occurrence of carrier development and image defects resulting from cleaning failure. Presumably, the reasons therefor are as follows.

The coat layers 22 of the carrier particles 20 contain barium titanate particles 23 in the developer 1 according to the present embodiment. Since the barium titanate particles 23 being a ferroelectric have a high specific permittivity, the carrier particles 20 containing the barium titanate particles 23 in their coat layers 22 have high charge retention ability. The carrier particles 20 with high charge retention ability can provide a sufficient amount of charge to the toner particles 10 by contact with the toner particles 10. Here, where multiple image printing is performed using an image forming apparatus, the toner concentration in the developer 1 loaded in a development device may vary during printing. However, even if the toner concentration in the developer 1 increases and the number of charged toner particles 10 increase, carrier particles 20 with high charge retention ability can provide a sufficient amount of charge to the toner particles 10, reaching the saturation charge level for the toner particles 10. As a result, variation in charge amount of the toner can be reduced to achieve stable formation of images with desired image density even when the toner concentration in the developer 1 changes. Furthermore, since the carrier particles 20 can provide a sufficient amount of charge to the toner particles 10, a portion of the toner particles 10 whose charge amount is less than a desired value and another portion of the toner particles 10 that are oppositely charged can be reduced, thereby achieving formation of images with less fog.

The barium titanate particles 23 have a number average primary particle diameter of at least 100 nm and no greater than 500 nm in the developer 1 according to the present embodiment. When the number average primary particle diameter of the barium titanate particles 23 is less than 100 nm, the specific permittivity thereof tends to decrease. As a result of the number average primary particle diameter of the barium titanate particles 23 being set to at least 100 nm, the specific permittivity of the barium titanate particles 23 is sufficiently high. As a result of including the coat layers 22 containing the barium titanate particles 23 with high specific permittivity, the carrier particles 20 can provide a sufficient amount of charge to the toner particles 10. Thus, despite variations in the toner concentration in the developer 1, fluctuations in the charge amount of the toner can be minimized, resulting in stable formation of images with the desired image density. Moreover, because the carrier particles 20 can provide a sufficient amount of charge to the toner particles 10, toner particles 10 having a charge amount less than the desired value and toner particles 10 having an opposite charge can be reduced, resulting in formation of images with less fog. As a result of the number average primary particle diameter of the barium titanate particles 23 being set to no greater than 500 nm by contrast, the barium titanate particles 23 will sink into the coat layers 22 and are hardly detached from the coat layers 22. Accordingly, a phenomenon in which the barium titanate particles 23 become detached to be transported to a gap between a photosensitive drum and a cleaning blade can be inhibited. As a result, cleaning failure and ultimately image defects resulting therefrom will hardly occur.

The barium titanate particles 23 have a content of at least 5 parts by mass and no greater than 45 parts by mass relative to 100 parts by mass of the coating resin in the developer 1 according to the present embodiment. As a result of the content of the barium titanate particles 23 being set to at least 5 parts by mass relative to 100 parts by mass of the coating resin, the amount of the barium titanate particles 23 in the coat layers 22 increases to enhance charge retention ability of the carrier particles 20. The carrier particles 20 with high charge retention ability can provide a sufficient amount of charge to the toner particles 10 by contact with the toner particles 10. Therefore, variation in charge amount of the toner can be reduced to achieve stable formation of images with desired image density even when the toner concentration in the developer 1 changes. Furthermore, since the carrier particles 20 can provide a sufficient amount of charge to the toner particles 10, toner particles 10 whose charge amount is less than the desired value and toner particles 10 that are oppositely charged can be reduced, thereby achieving formation of less fog. As a result of the content of the barium titanate particles 23 being set to no greater than 45 parts by mass relative to 100 parts by mass of the coating resin by contrast, the barium titanate particles 23 will sink into the coat layers 22 and are hardly detached from the coat layers 22. Accordingly, a phenomenon in which the detached barium titanate particles 23 inhibit contact between the toner particles 10 and the carrier particles 20 will hardly occur. Thus, a sufficient amount of charge can be provided to the toner particles 10 from the carrier particles 20. As a result, toner particles 10 whose charge amount is less than the desired value and toner particles 10 that are oppositely charged can be reduced, resulting in formation of images with less fog.

The carrier particles 20 have a coat layer/core rate of at least 0.09% by mass and no greater than 4.90% by mass in the developer 1 according to the present embodiment. As a result of the coat layer/core rate being set at no greater than 4.90% by mass, the coat layers 22 can be suitably thin. The coating resin contained in the coat layers 22 is hygroscopic. When the coat layers 22 are suitably thin, the amount of the coating resin decreases to reduce influence (e.g., influence of decreasing triboelectric charge amount of the toner particles 10) on triboelectric charging caused by the coating resin absorbing moisture. Furthermore, as a result of the coat layer/core rate being set to no greater than 4.90% by mass, agglomeration of the carrier particles 20 can be inhibited in formation of the coat layers 22 in a later-described carrier formation process. Non-agglomerated or less agglomerated carrier particles 20 can cause favorable triboelectric charging with a result that the toner particles 10 are triboelectrically charged to the desired charge amount. As a result, toner particles 10 whose charge amount is less than the desired value and toner particles 10 that are oppositely charged can be reduced, thereby achieving formation of images with less fog. As a result of the coat layer/core rate being set to at least 0.09% by mass by contrast, the coat layers 22 are not excessively thin. As a result, the toner particles 10 are triboelectrically charged to the desired charge amount by contact between the toner particles 10 and the coat layers 22 of the carrier particles 20. Thus, toner particles 10 whose charge amount is less than the desired value and toner particles 10 that are oppositely charged can be reduced, thereby achieving formation of images with less fog. Furthermore, as a result of the coat layer/core rate being set to at least 0.09% by mass, the occurrence of a defect (carrier development) in which the carrier particles 20 adhere to the photosensitive drum is inhibited.

The coverage rate of the carrier cores 21 is at least 80.0% and less than 100.0% in the developer 1 according to the present embodiment. The coverage rate of the carrier cores 21 is less than 100.0%, which means they are not 100.0%. Therefore, the coat layers 22 do not completely cover the entire surface of the coat layers 22. The coat layers 22 partially cover the surfaces of the carrier cores 21. As illustrated in FIGURE, a carrier core 21 has covered regions A1 and non-covered regions A2. The covered regions A1 each are a region of the surface of the carrier core 21 that is covered with a coat layer 22. The non-covered regions A2 each are a region of the surface of the carrier core 21 that is not covered with the coat layer 22. The carrier core 21 is exposed in the non-covered regions A2 without being covered with the coat layer 22.

The coverage rate of the carrier cores 21 is less than 100.0%, which means it is not 100.0%. Therefore, the non-covered regions A2 not covered with the coat layers 22 are present in the carrier cores 21. The coating resin contained in the coat layers 22 is hygroscopic. Presence of the non-covered regions A2 can reduce influence (e.g., influence of decreasing triboelectric charge amount of the toner particles 10) on triboelectric charging caused by the coating resin absorbing moisture. Furthermore, the non-covered regions A2 not covered with the coat layers 22 containing the coating resin have a low electric resistance, so charges can easily move through the non-covered regions A2. Presence of the non-covered regions A2 through which charge easily moves can triboelectrically charge the toner particles 10 to the desired charge amount within a short period of time by contact with the carrier particles 20. Furthermore, presence of the non-covered regions A2 through which charge easily moves can make the toner particles 10 not excessively charged triboelectrically by contact with the carrier particles 20. As a result, toner particles 10 whose charge amount is less than the desired value and toner particles 10 that are oppositely charged can be reduced, thereby achieving formation of images with less fog.

Here, the non-covered regions A2 are present in a dispersed manner in the surfaces of the carrier particles 20. Contact of the toner particles 10 with the covered regions A1 present around the non-covered regions A2 can triboelectrically charge the toner particles 10 to the desired charge amount. However, when the coverage rate of the carrier cores 21 is less than 80.0%, the covered regions A1 are too narrow. Therefore, it is difficult to triboelectrically charge the toner particles 10 to the desired charge amount even upon contact with the carrier particles 20. As a result of the coverage rate of the carrier cores 21 being set to at least 80.0%, the toner particles 10 can be triboelectrically charged to the desired charge amount by contact with the carrier particles 20. Thus, toner particles 10 whose charge amount is less than the desired value and toner particles 10 that are oppositely charged can be reduced, thereby achieving formation of images with less fog. Moreover, as a result of the coverage rate of the carrier cores 21 being set to at least 80.0%, the occurrence of carrier development is inhibited.

The external additive particles 12 of the toner particles 10 include large-diameter silica particles 13 in the developer 1 according to the present embodiment. The coat layers 22 contain the barium titanate particles 32 which are hard, and therefore the carrier particles 20 are relatively hard. The large-diameter silica particles 13 with a number average primary particle diameter of at least 30 nm function as a spacer in contact between the toner particles 10 and the carrier particles 20. As such, even when the carrier particles 20 are relatively hard, the external additive particles 12 (e.g., large-diameter silica particles 13 and optional external additive particles 14 later described) are hardly buried in the surfaces of the toner mother particles 11 by contact with the carrier particles 20, thereby inhibiting the charge amount of the toner particles 10 from being lower than the desired value. Thus, images with less fog can be formed. By contrast, the large-diameter silica particles 13, with a number average primary particle diameter of no greater than 120 nm, hardly detach from the toner base particles 11. As a result, reduction of fluctuations in the charge amount of the toner and stable formation of images with desired image density can be achieved. Moreover, toner particles 10 having a charge amount less than a desired value and toner particles 10 charged oppositely can be reduced, achieving the formation of images with less fog.

The reasons why the developer 1 according to the present embodiment can contribute to excellent fog resistance, stable formation of images with desired image density, and inhibition of occurrence of carrier development and image defects resulting from cleaning failure have been described so far.

In addition to the above advantages, scraping of the coat layers 22 can be reduced as a result of the coat layers 22 containing the hard barium titanate particles 23, thereby extending lifespan of the carrier particles 20 in the developer 1 according to the present embodiment. Next, the toner and the carrier that are contained in the developer 1 are described further in detail.

[Toner]

The toner contains toner particles 10. The toner particles 10 each include a toner mother particle 11 and external additive particles 12. The external additive particles 12 are provided on the surface of the toner mother particle 11. The external additive particles 12 and the toner mother particles 11 are described below.

<External Additive Particles>

The external additive particles 12 include large-diameter silica particles 13. The external additive particles 12 may further include external additive particles (also referred to below as optional external additive particles) 14 other than the large-diameter silica particles 13 as necessary. The large-diameter silica particles 13 and the optional external additive particles 14 are described below.

(Large-Diameter Silica Particles)

As described previously, the large-diameter silica particles 13 have a number average primary particle diameter of at least 30 nm and no greater than 120 nm. In order to stably form images with less fog and desired image density, the large-diameter silica particles 13 have a number average primary particle diameter of preferably at least 40 nm, more preferably at least 60 nm, further preferably at least 80 nm, and particularly preferably at least 100 nm. The number average primary particle diameter of the large-diameter silica particles 13 can be measured using, for example, a scanning electron microscope.

Examples of the large-diameter silica particles 13 include sol-gel silica particles and fumed silica particles.

Sol-gel silica particles, also called wet silica particles, are synthesized in a liquid, for example. The sol-gel silica particles have a relatively large number average primary particle diameter because they grow in the liquid during synthesis. When sol-gel silica particles are used as the large-diameter silica particles 13, the number average primary particle diameter of these particles tends to increase with a longer reaction time during synthesis.

Fumed silica particles, also called dry silica particles, are produced through combustion of silicon tetrachloride, for example. In one example of a method for producing fumed silica particles, a raw material mixture of silicon tetrachloride, a reducing agent, and water is heated to generate silicon dioxide gas. The silicon dioxide gas is then cooled by blowing cooling air to precipitate fumed silica particles. The heating temperature of the raw material mixture is preferably at least 1000° C. and no greater than 2000° C. The number average primary particle diameter of the fumed silica particles tends to increase as the flow rate of the blown cooling air is reduced. The flow rate of the cooling air is preferably at least 50 $m^3$/hour and no greater than 150 $m^3$/hour, and more preferably at least 80 $m^3$/hour and no greater than 110 $m^3$/hour. Table 1 shows reaction examples (1-A) to (1-C). Reaction examples (1-A) to (1-C) each show the relationship between the flow rate of cooling air and the number average primary particle diameter of the large-diameter silica particles 13 obtained when the heating temperature of the mixed raw material is 1800° C. In Table 1, "Diameter" indicates the number average primary particle diameter of the large-diameter silica particles 13.

TABLE 1

| Reaction example | Flow rate of cooling air [$m^3$/hour] | Diameter [nm] |
|---|---|---|
| 1-A | 80 | 100 |
| 1-B | 90 | 70 |
| 1-C | 110 | 60 |

The large-diameter silica particles 13 may be produced by binding silica particles to each other using at least one selected from the group consisting of silicone and a silane coupling agent to obtain a binding material, and then crushing the binding material. The large-diameter silica particles 13 produced in this manner are, for example, composite particles (binding particles) of a plurality of silica particles and a binder. In the composite particles, the binder, present among the plurality of silica particles, is at least one selected from the group consisting of silicone and a silane coupling agent. One example of the silicone is dimethylpolysiloxane. Examples of the silane coupling agent include silane coupling agents having an amino group, and more specific examples include 3-aminopropyltrimethoxysilane and aminopropylethoxysilane. The temperature for binding the silica particles is preferably at least 50° C. and no greater than 200° C. The binding material may be crushed, for example, using a jet mill. A larger airflow rate of the jet mill during crushing of the binding material resulting in the large-diameter silica particles 13 having a greater number average primary particle diameter. The airflow rate of the jet mill during crushing of the binding material is preferably at least 1.2 $m^3$/min and no greater than 2.0 $m^3$/min, and more preferably at least 1.2 $m^3$/min and no greater than 1.5 $m^3$/min. Table 2 shows reaction examples (2-A) to (2-D). Reaction examples (2-A) to (2-D) each show the relationship between the airflow rate of the jet mill during crushing of the binding material and the number average primary particle diameter of the large-diameter silica particles 13 obtained. In Table 2, "Diameter" indicates the number average primary particle diameter of the large-diameter silica particles 13.

TABLE 2

| Reaction example | Airflow rate of jet mill [$m^3$/min] | Diameter [nm] |
|---|---|---|
| 2-A | 0.5 | 13 |
| 2-B | 1.0 | 20 |
| 2-C | 1.2 | 30 |
| 2-D | 1.5 | 40 |

The large-diameter silica particles 13 may undergo surface treatment. The surface of the large-diameter silica particles 13 may be rendered either or both hydrophobic and positively chargeable using, for example, a surface treatment agent. Examples of surface treatment agents that can be used include silicone oil and silane coupling agents (e.g., 3-aminopropyltrimethoxysilane and aminopropylethoxysilane).

The large-diameter silica particles 13 preferably have a bulk density of at least 0.1 g/$cm^3$ and no greater than 1.0 g/$cm^3$. The large-diameter silica particles 13 preferably have a true specific gravity of at least 1.0 and no greater than 2.0. The BET specific surface area of the large-diameter silica particles 13 is preferably at least 20 $m^2$/g and no greater than 60 $m^2$/g. The degree of hydrophobicity of the large-diameter silica particles 13 is preferably at least 50% and no greater than 80%.

The amount of the large-diameter silica particles 13 is preferably at least 0.1 parts by mass and no greater than 10.0 parts by mass relative to 100.0 parts by mass of toner mother particles 11, and more preferably at least 0.4 parts by mass and no greater than 1.0 parts by mass, (Optional External Additive Particles)

Examples of the optional external additive particles 14 include, alumina particles, magnesium oxide particles, zinc oxide particles, and silica particles having a number average primary particle diameter of less than 30 nm. The "silica particles having a number average primary particle diameter of less than 30 nm" may be referred to below as "small-diameter silica particles".

The small-diameter silica particles preferably have a number average primary particle diameter of at least 5 nm and no greater than 25 nm. Either or both hydrophobicity and positive chargeability may be imparted to the surfaces of the small-diameter silica particles with a surface treatment agent. Examples of the small-diameter silica particles include fumed silica particles. The small-diameter silica particles may not be composite particles (binding particles) containing a plurality of silica particles and a binder because an increase in the number average primary particle diameter is unnecessary, For example, the small-diameter silica particles may be silica particles including silica particles consisting only of silica (e.g., fumed silica or silica particles including silica cores consisting only of silica (e.g., fumed silica) and surface treatment layers of a surface treatment agent.

When the small-diameter silica particles are used as the optional external additive particles 14, the amount of the large-diameter silica particles 13 is preferably at least 0.4 parts by mass and no greater than 1.0 parts by mass relative to 1.5 parts by mass of the small-diameter silica particles.

The optional external additive particles 14 other than the small-diameter silica particles have a number average primary particle diameter of preferably at least 1 nm and no greater than 60 nm, and more preferably at least 5 nm and no greater than 25 nm.

The amount of the optional external additive particles 14 is preferably at least 0.1 parts by mass and no greater than 10.0 parts by mass relative to 100.0 parts by mass of the toner mother particles 11, and more preferably at least 1.0 parts by mass and no greater than 2.0 parts by mass. The amount of the large-diameter silica particles 13 is preferably at least 0.4 parts by mass and no greater than 1.0 parts by mass relative to 1.5 parts by mass of the optional external additive particles 14.

<Toner Mother Particles>

The toner mother particles 11 contain at least one selected from the group consisting of a binder resin, a colorant, a charge control agent, and a releasing agent, for example. The following describes the binder resin, the colorant, the charge control agent, and the releasing agent.

(Binder Resin)

In order that the toner has excellent low-temperature fixability, the toner mother particles 11 preferably contain a thermoplastic resin as the binder resin, and more preferably contain a thermoplastic resin at a rate of at least 85% by mass of the total of the binder resin. Examples of the thermoplastic resin include polyester resins, styrene-based resins, acrylic acid ester-based resins (specific examples include acrylic acid ester polymers and methacrylic acid ester polymers), olefin-based resins (specific examples include polyethylene resin and polypropylene resin), vinyl resins (specific examples include vinyl chloride resin, polyvinyl alcohol, vinyl ether resin, and N-vinyl resin), polyamide resins, and urethane resins. Any copolymer of these resins, that is, any copolymer (more specific examples include styrene-acrylic resin and styrene-butadiene-based resin) with any repeating unit introduced into any of the resins may be used as the binder resin.

The binder resin is preferably a polyester resin. The polyester resin is a polymer of at least one polyhydric alcohol monomer and at least one polybasic carboxylic acid monomer. Note that a polybasic carboxylic acid derivative (specific examples include an anhydride of polybasic carboxylic acid and a polybasic carboxylic acid halide) may be used instead of the polybasic carboxylic acid monomer.

Examples of the polyhydric alcohol monomer include diol monomers, bisphenol monomers, and tri- or higher-hydric alcohol monomers.

Examples of the diol monomers include ethylene glycol, diethylene glycol, triethylene glycol, 1,2-propanediol, 1,3-propanediol, 1,4-butanediol, neopentyl glycol, 2-butene-1,4-diol, 1,5-pentanediol, 1,6-hexanediol, 1,4-cyclohexanedimethanol, 1,4-benzenediol, dipropylene glycol, polyethylene glycol, polypropylene glycol, and polytetramethylene glycol.

Examples of the bisphenol monomers include bisphenol A, hydrogenated bisphenol A, bisphenol A ethylene oxide adducts, and bisphenol A propylene oxide adducts.

Examples of the tri- or higher hydric alcohol monomers include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, diglycerol, 2-methylpropanetriol, 2-methyl-1,2,4-butanetriol, trimethylolethane, trimethylolpropane, and 1,3,5-trihydroxymethylbenzene.

Examples of the polybasic carboxylic acid monomer include dibasic carboxylic acid monomers and tri- or higher-basic carboxylic acid monomers.

Examples of the dibasic carboxylic acid monomers include maleic acid, fumaric acid, citraconic acid, itaconic acid, glutaconic acid, phthalic acid, isophthalic acid, terephthalic acid, 5-sulfoisophthalic acid, sodium 5-sulfoisophthalic acid, cyclohexanedicarboxylic acid, adipic acid, sebacic acid, azelaic acid, malonic acid, succinic acid, alkyl succinic acids, and alkenyl succinic acids. Examples of the alkyl succinic acids include n-butylsuccinic acid, isobutylsuccinic acid, n-octylsuccinic acid, n-dodecylsuccinic acid, and isododecylsuccinic acid. Examples of the alkenyl succinic acids include n-butenylsuccinic acid, isobutenylsuccinic acid, n-octenylsuccinic acid, n-dodecenylsuccinic acid, and isododecenylsuccinic acid.

Examples of the tri- or higher-basic carboxylic acid monomers include 1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl) methane, 1,2,7,8-octanetetracarboxylic acid, pyromellitic acid, and EMPOL trimer acid.

Preferably, the polyester resin is a polymer of a bisphenol monomer, a dibasic carboxylic acid monomer, and a tribasic carboxylic acid monomer. More preferably, the polyester resin is a polymer of a bisphenol A alkylene oxide adduct, a dicarboxylic acid having a carbon number of at least 3 and no greater than 6, and an aryltricarboxylic acid. The polyester resin is further preferably a polymer of a bisphenol A ethylene oxide adduct, a bisphenol A propylene oxide adduct, fumaric acid, and trimellitic acid.

The polyester resin is preferably a non-crystalline polyester resin. For many non-crystalline polyester resins, it is often not possible to determine a clear melting point. As such, a polyester resin for which no clear endothermic peak cannot be determined on an endothermic curve measured using a differential scanning calorimeter can be determined to be a non-crystalline polyester resin.

The polyester resin has a softening point of preferably at least 50° C. and no greater than 200° C., and more preferably at least 80° C. and no greater than 120° C. The polyester resin has a glass transition point of preferably at least 40° C. and no greater than 100° C., and more preferably is at least 40° C. and no greater than 60° C.

The polyester resin has a mass average molecular weight of preferably at least 10,000 and no greater than 50,000, and more preferably at least 20,000 and no greater than 40,000.

The polyester resin has an acid value of preferably at least 1 mgKOH/g and no greater than 30 mgKOH/g, and more preferably at least 10 mgKOH/g and no greater than 20 mgKOH/g. The polyester resin has a hydroxyl value of preferably at least 1 mgKOH/g and no greater than 50 mgKOH/g, and more preferably at least 20 mgKOH/g and no greater than 40 mgKOH/g.

The amount of the binder resin is preferably at least 85 parts by mass and no greater than 95 parts by mass relative to 100 parts by mass of the toner mother particles 11.

(Colorant)

The colorant can be a known pigment or dye that matches the color of the toner. Examples of the colorant include black colorants, yellow colorants, magenta colorants, and cyan colorants.

Carbon black can for example be used as a black colorant. Alternatively, a black colorant can be used that has been adjusted to a black color using a yellow colorant, a magenta colorant, and a cyan colorant.

Examples of a yellow colorant that can be used include at least one compound selected from the group consisting of a condensed azo compound, an isoindolinone compound, an anthraquinone compound, an azo metal complex, a methine compound, and an arylamide compound. Examples of the yellow colorant include C.I. Pigment Yellow (3, 12, 13, 14, 15, 17, 62, 74, 83, 93, 94, 95, 97, 109, 110, 111, 120, 127, 128, 129, 147, 151, 154, 155, 168, 174, 175, 176, 180, 181, 191, or 194), Naphthol Yellow S, Hansa Yellow G, and C.I. Vat Yellow.

Examples of a magenta colorant that can be used include at least one compound selected from the group consisting of a condensed azo compound, a diketopyrrolopyrrole compound, an anthraquinone compound, a quinacridone compound, a basic dye lake compound, a naphthol compound, a benzimidazolone compound, a thioindigo compound, and a perylene compound. Examples of the magenta colorant include C.I. Pigment Red (2, 3, 5, 6, 7, 19, 23, 48:2, 48:3, 48:4, 57:1, 81:1, 122, 144, 146, 150, 166, 169, 177, 184, 185, 202, 206, 220, 221, or 254).

Examples of a cyan colorants that can be used include at least one compound selected from the group consisting of a copper phthalocyanine compound, an anthraquinone compound, and a basic dye lake compound. Examples of the cyan colorant include C.I. Pigment Blue (1, 7, 15, 15:1, 15:2, 15:3, 15:4, 60, 62, or 66), Phthalocyanine Blue, C.I. Vat Blue, and C.I. Acid Blue.

The amount of the colorant is preferably at least 1 part by mass and no greater than 20 parts by mass relative to 100 parts by mass of the binder resin.

(Charge Control Agent)

The charge control agent is used for example for the purpose of improving charge stability and a charge rise characteristic of the toner. The charge rise characteristic of the toner is an indicator as to whether the toner can be charged to a specific charge level in a short period of time. Examples of the charge control agent include positive charge control agents and negative charge control agents. When a positive charge control agent is contained in the toner mother particles 11, cationic strength (positive chargeability) of the toner can be increased. When a negative charge control agent is contained in the toner mother particles 11, anionic strength (negative chargeability) of the toner can be increased. Examples of the positive charge control agents include pyridine, nigrosine, and quaternary ammonium salts. Examples of the negative charge control agents include metal-containing azo dyes, sulfo group-containing resins, oil-soluble dyes, naphthenic acid metal salts, acetylacetone metal complexes, salicylic acid-based metal complexes, boron compounds, fatty acid soaps, and long-chain alkyl carboxylates. However, the toner mother particle 11 does not need to contain a charge control agent where sufficient chargeability is ensured in the toner. The amount of the charge control agent is preferably at least 1 part by mass and no greater than 10 parts by mass relative to 100 parts by mass of the binder resin.

(Releasing Agent)

The releasing agent is used for example for the purpose of obtaining a toner excellent in hot offset resistance. Examples of the releasing agent include aliphatic hydrocarbon-based waxes, oxides of aliphatic hydrocarbon-based waxes, plant waxes, animal waxes, mineral waxes, waxes having a fatty acid ester as a main component, and waxes in which a fatty acid ester has been partially or fully deoxidized. Examples of the aliphatic hydrocarbon waxes include polyethylene waxes (e.g., low molecular weight polyethylene), polypropylene waxes (e.g., low molecular weight polypropylene), polyolefin copolymers, polyolefin wax, microcrystalline wax, paraffin wax, and Fischer-Tropsch wax. Examples of the oxides of aliphatic hydrocarbon waxes include oxidized polyethylene waxes and block copolymers of oxidized polyethylene waxes. Examples of the plant waxes include candelilla wax, carnauba wax, Japan wax, jojoba wax, and rice wax. Examples of the animal waxes include bee wax, lanolin, and spermaceti. Examples of the mineral waxes include ozokerite, ceresin, and petrolatum. Examples of the waxes having a fatty acid ester as a main component include montanic acid ester wax and castor wax. Examples of the waxes in which a fatty acid ester has been partially or fully deoxidized include deoxidized carnauba wax. The amount of the releasing agent is preferably at least 1 part by mass and no greater than 20 parts by mass relative to 100 parts by mass of the binder resin.

Note that the toner particles 10 may contain a known additive as necessary. Preferably, the toner particles 10 have a volume median diameter of at least 4 μm and no greater than 12 μm. The toner mother particles 11 have a volume median diameter of preferably at least 4 μm and no greater than 12 μm, and more preferably at least 5 μm and no greater than 9 μm. The toner particles 10 may be a magnetic toner or a non-magnetic toner. When the toner particles 10 are a magnetic toner, the toner mother particles 11 further contain a magnetic powder. The amount of the toner in the developer 1 is preferably at least 1 part by mass and no greater than 15 parts by mass relative to 100 parts by mass of the carrier, and more preferably at least 3 parts by mass and no greater than 10 parts by mass. FIGURE illustrates a non-capsule toner mother particle 11 for ease of description. However, capsule toner mother particles may be used each of which include the toner mother particle 11 illustrated in FIGURE as a toner core and a shell layer covering the toner core. The toner has been descried so far.

[Carrier]

The carrier contains carrier particles 20. The carrier particles 20 each include a carrier core 21 and a coat layer 22. The coat layer 22 covers the surface of the carrier core 21. The coat layer 22 is provided on the surface of the carrier core 21.

As described previously, the coat layer/core rate is at least 0.09% by mass and no greater than 4.90% by mass. Preferably, the coat layer/core rate is at least 0.11% by mass. The coat layer/core rate is preferably no greater than 4.40% by mass, further preferably no greater than 4.00% by mass, still more preferably no greater than 3.00% by mass, still further preferably no greater than 2.00% by mass, further more preferably no greater than 1.40% by mass, still further more preferably no greater than 1.00% by mass, especially preferably no greater than 0.90% by mass, more especially preferably no greater than 0.50% by mass, further especially preferably no greater than 0.25% by mass, particularly preferably no greater than 0.24% by mass, and more particularly preferably no greater than 0.20% by mass.

The rate of the mass of the coating resin to the mass of the carrier cores 21 is preferably at least 0.05% by mass and no greater than 4.00% by mass. In the following, the "rate of the mass of the coating resin to the mass of the carrier cores 21" may be also referred to as "resin/core rate". Preferably, the resin/core rate is at least 0.07% by mass. The resin/core rate is preferably no greater than 3.00% by mass, more preferably no greater than 2.50% by mass, further preferably no greater than 2.00% by mass, further more preferably no greater than 1.40% by mass, still further preferably no greater than 1.00% by mass, especially further preferably no greater than 0.90% by mass, more especially preferably no greater than 0.50% by mass, particularly preferably no greater than 0.25% by mass, more particularly preferably no greater than 0.24% by mass, and further particularly preferably no greater than 0.20% by mass.

The coverage rate of the carrier cores 21 is a rate of the area of the covered regions A1 of the carrier cores 21 covered with the coat layers 22 to the area of the surfaces of the carrier cores 21. The coverage rate of the carrier cores 21 is calculated in a manner that from a surface photographed image of carrier cores 21 photographed using a scanning electron microscope, an area of the covered regions A1 appearing on the surface photographed image and an area of the non-covered regions A2 appearing on the surface photographed image are obtained and a coverage rate is calculated using a formula "(coverage rate)=100×(area of covered regions A1)/(area of surfaces of carrier cores 21)=100×(area of covered regions A1)/(total area of covered regions A1 and non-covered regions A2)". Note that the method for adjusting the coverage rate of the carrier cores 21 is described later in <Carrire Formation Process>.

The coverage rate of the carrier cores 21 is a number average value calculated in a manner that coverage rate of a considerable number of (e.g., 100) carrier cores 21 contained in the carrier are measured and an average is calculated using a formula "(coverage rate)=(total of coverage rate of measured carrier cores 21)/(number of measured charrier cores 21)". The coverage rate of the carrier cores 21 is at least 80.0% and less than 100.0% as described previously. In order to form images with less fog, the coverage rate of the carrier cores 21 is preferably at least 85.0%, more preferably at least 90.0%, further preferably greater than 90.0%, further more preferably at least 92.0%, still further preferably at least 95.0%, and particularly preferably at least 96.0%. In order to form images with less fog, the coverage rate of the carrier cores 21 is preferably no greater than 99.0%.

In order to charge the toner to a desired charge amount and form images with less fog, the BET specific surface area of the carrier particles 20 is preferably at least 0.3 $m^2/g$ and no greater than 3.5 $m^2/g$, and more preferably at least 0.3 $m^2/g$ and no greater than 3.0 $m^2/g$. The BET specific surface area of the carrier particles 20 is determined based on the amount of liquid nitrogen adsorbed on the surfaces of the carrier particles 20 using an automatic specific surface area measuring device by the BET method (nitrogen adsorption specific surface area method).

The shape factor of the carrier particles 20 is calculated from the formula "shape factor of carrier particles 20=actual carrier particle diameter/calculated carrier particle diameter". The calculated carrier particle diameter in the above formula is calculated from the formula "calculated carrier particle diameter=6/(true specific gravity of carrier particles 20×BET specific surface area of carrier particles 20)". The shape factor of the carrier particles 20 is measured, for example, using the method described in Examples.

The shape factor of the carrier particles 20 is preferably at least 7.0 and no greater than 55.0. Carrier particles 20 with a shape factor closer to 1.0 have a shape closer to a spherical shape with less unevenness on their surfaces. As a result of the shape factor of the carrier particles 20 being set to at least 7.0, unevenness on the surfaces of the carrier particles 20 become moderately large, enabling recesses on the surface of the carrier particles 20 to capture the external additive particles 12 detached from the toner particles 10. As such, the influence of the detached external additive particles 12 can be reduced, allowing the carrier particles 20 to charge the toner particles 10 to a desired charge amount. As a result of the shape factor of the carrier particles 20 being set to no greater than 55.0 by contrast, the coat layers 22 tend to be formed on the surfaces of the carrier particles 20 in a dispersed state rather than in an aggregated state. As such, fluidity of the carrier particles 20 is improved, and the toner particles 10 tend to be charged to a desired charge amount in a short period of time by contact with the carrier particles 20. Note that a method for adjusting the shape factor of the carrier particles 20 will be described in <Carrier Formation Process>.

The ratio of the coverage rate of the carrier cores 21 to the shape factor of the carrier particles 20 is preferably at least 1.9 and no greater than 11.5. In the following, the "ratio of the coverage rate of the carrier cores 21 to the shape factor of the carrier particles 20" may be referred to as "ratio (coverage rate/shape factor)". The ratio (coverage rate/shape factor) is calculated from the formula "ratio (coverage rate/shape factor)=coverage rate of carrier cores 21/shape factor of carrier particles 20". The coverage rate of the carrier cores 21 and the shape factor of the carrier particles 20 are measured, for example, using the method described in Examples.

The higher the ratio (coverage rate/shape factor), the higher the coverage rate of the carrier cores 21, and the smaller the shape factor of the carrier particles 20 tends to be (unevenness on the surfaces of the carrier particles 20 become smaller). As a result of the ratio (coverage rate/shape factor) being set to at least 1.9 and no greater than 11.5, the coverage rate of the carrier cores 21 and the shape factor of the carrier particles 20 are well balanced. Consequently, the carrier particles 20 can provide a sufficient amount of charge to the toner particles 10. As a result, there is a reduction in toner particles 10 with a charge amount less than a desired value and toner particles 10 charged oppositely, achieving the formation of images with less fog. As a result of the ratio (coverage rate/shape factor) being set to no greater than 11.5, it is possible to form images with particularly less fog in the formation of images with a low printing rate (e.g., a printing rate of about 5%). As a result of the ratio (coverage rate/shape factor) being at least 1.9, it is possible to form images with particularly less fog both in the formation of images with a low printing rate and the formation of images with a high printing rate (e.g., a printing rate of at least 30%).

The carrier cores 21 and the coat layers 22 of the carrier particles 20 are described next.

<Carrier Cores>

The carrier cores 21 contain a magnetic material, for example. Examples of the magnetic material contained in the carrier cores 21 include metal oxides, and more specific examples include magnetite, maghemite, and ferrite. Ferrite has high fluidity and tends to be chemically stable. As such, the carrier cores 21 preferably contain ferrite in terms of formation of high-quality images over a long period of term. Examples of ferrite include barium ferrite, manganese ferrite (Mn-ferrite), Mn—Zn ferrite, Ni—Zn ferrite, Mn—Mg ferrite, Ca—Mg ferrite, Li ferrite, and Cu—Zn ferrite. The shape of the carrier cores 21 is not limited particularly and may be irregular or spherical. A commercially available product may be used as the carrier cores 21. Alternatively, the carrier cores 21 may be self-made by crushing and sintering the magnetic material.

The carrier cores 21 have a volume median diameter of preferably at least 20.0 μm, and more preferably at least 25.0 μm. As a result of the volume median diameter of the carrier cores 21 being set to at least 20.0 μm, carrier development can hardly occur. Thus, a phenomenon in which the carrier particles 20 attaching to the photosensitive drum transfers from the photosensitive drum to a transfer section can be inhibited, thereby inhibiting occurrence of image defects such as void. By contrast, the carrier cores 21 have a volume median diameter of preferably no greater than 80.0 μm, more preferably no greater than 65.0 μm, further preferably no greater than 60.0 μm, further more preferably no greater than 50.0 μm, still further more preferably less than 40.0 μm, and particularly preferably no greater than 35.0 μm, As a result of the volume median diameter of the carrier cores 21 being set to no greater than 80.0 μm by contrast, a fine magnetic brush of the developer 1 can be formed on the circumferential surface of a development roller in image formation, thereby achieving formation of fine texture images. The volume median diameter of the carrier cores 21 is measured by the method described in Examples, for example.

The carrier cores 21 have a saturation magnetization of preferably at least 65 emu/g and no greater than 90 emu/g, and more preferably at least 70 emu/g and no greater than 85 emu/g. As a result of the saturation magnetization of the carrier cores 21 being set to at least 65 emu/g, carrier development will hardly occur. As a result of the saturation magnetization of the carrier cores 21 being set to no greater than 90 emu/g, a fine magnetic brush of the developer 1 can be formed on the circumferential surface of the development roller in image formation, thereby achieving formation of fine texture images. Where the carrier cores 21 contain Mn-ferrite, the higher the percentage content of Mn is, the lower the saturation magnetization of the carrier cores 21 tends to be. Also, where the carrier cores 21 contain Mn—Mg ferrite, the higher the percentage content of the Mg is, the lower the saturation magnetization of the carrier cores 21 tends to be. The saturation magnetization of the carrier cores 21 is measured by the method described in Examples, for example.

The carrier cores 21 preferably have an apparent density of at least $1.20\times10^{3}$ kg/m$^{3}$ and no greater than $2.80\times10^{3}$ kg/m$^{3}$. The carrier cores 21 preferably have a degree of fluidity of at least 21 sec/50 g and no greater than 50 sec/50 g. The carrier cores 21 preferably have an electrical resistivity of at least $1\times10^{2}$ (2·m and no greater than $1\times10^{7}$ Ω·m. The carrier cores preferably have a residual magnetization of at least 0.4 Am$^{2}$/kg and no greater than 10.0 Am$^{2}$/kg. The carrier cores 21 have a coercive force of at least 5 A/m·$10^{3}$/4π and no greater than 10 A/m·$10^{3}$/4π.

<Coat Layers>

The coat layers 22 contain a coating resin and barium titanate particles 23. Preferably, the coat layers 22 further contain carbon black particles 24. However, the carbon black particles 24 can be dispensed with. The coat layers 22 each have coating resin regions 25. The coating resin regions 25 are constituted by the coating resin. The coating resin regions 25 each are a region that contains only the coating resin. The coat layers 22 are each constituted by the barium titanate particles 23, the carbon black particles 24, and the coating resin regions 25 present therearound. The coating resin, the barium titanate particles 23, and the carbon black particles 24 are described below.

(Coating Resin)

The coating resin includes a silicone resin. As a result of the coating resin including a silicone resin, the toner can be triboelectrically charged to the desired charge amount in a favorably manner. Furthermore, as a result of use of a silicone resin as the coating resin, the coat layers 22 can be thinner than those made with a resin (e.g., fluororesin) other than the silicone resin. Thus, the amount of the coating resin contained in the coat layers 22 can be reduced and influence (e.g., influence of decreasing triboelectric charge amount of the toner particles 10) on triboelectric charging caused by the coating resin absorbing moisture can be reduced.

Preferable examples of the silicone resin include epoxy resin modified silicone resins and silicone resins having a methyl group. One examples of the silicone resins having a methyl group is a silicone resin having a methyl group and not having a phenyl group. Another example of the silicone resins having a methyl group is a silicone resin (also referred to below as a "methylphenyl silicone resin") having a methyl group and a phenyl group. The coat layers 22 may contain only a silicone resin as the coating resin or may further contain a resin other than the silicone resin.

(Barium Titanate Particles)

As described previously, the barium titanate particles 23 have a number average primary particle diameter of at least 100 nm and no greater than 500 nm. In order to form images with less fog, the number average primary particle diameter of the barium titanate particles 23 is preferably at least 200 nm. In order to inhibit occurrence of image defects resulting from cleaning failure, the number average primary particle diameter of the barium titanate particles 23 is preferably no greater than 400 nm. The number average primary particle diameter of the barium titanate particles 23 is measured by the method described in Examples, for example.

As described previously, the barium titanate particles 23 have a content of at least 5 parts by mass and no greater than 45 parts by mass relative to 100 parts by mass of the coating resin. The content of the barium titanate particles 23 is preferably at least 25 parts by mass and no greater than 45 parts by mass relative to 100 parts by mass of the coating resin. When the coating resin includes two or more resins, 100 parts by mass of the coating resin means the total mass of the two or more resins being 100 parts by mass.

No particular limitations are placed on a method for producing the barium titanate particles 23, and the method may be hydrothermal synthesis or the oxalate method, for example. Preferably, the method for producing the barium titanate particles 23 is the hydrothermal synthesis. That is, the barium titanate particles 23 are preferably made from a hydrothermal compound. Having voids thereinside, barium titanate particles 23 produced by the hydrothermal synthesis have a smaller true specific gravity than those produced by the oxalate method. Furthermore, the barium titanate particles 23 produced by the hydrothermal synthesis have a sharp particle diameter distribution. For these reasons, the barium titanate particles 23 produced by the hydrothermal synthesis easily disperse uniformly in the coating resin, thereby easily obtaining a carrier with uniform charge imparting ability. As a result, the toner is quickly charged by friction with the carrier and images with further less fog can be formed.

The hydrothermal synthesis includes a hydrothermal reaction process and a thermal treatment process, for example. In the hydrothermal reaction process, a water-soluble barium salt is added to a titanium oxide dispersion in which titanium oxide particles are dispersed and the resultant dispersion is heated to cause a hydrothermal reaction. Barium titanate hydrothermally synthesized particles are obtained in the manner described above. In the thermal treatment process, the barium titanate hydrothermally synthesized particles are heat-treated to obtain the barium titanate particles 23. The heating temperature in the hydrothermal reaction process is preferably at least 80° C. The heating temperature in the thermal treatment process is preferably at least 650° C. and no greater than 850° C. The number average primary particle diameter of the barium titanate particles 23 can be adjusted for example by changing the heating temperature and the time for the hydrothermal reaction in the hydrothermal reaction process. For example, the higher the heating temperature in the hydrothermal reaction process is, the larger the number average primary particle diameter of the barium titanate particles 23 is. Also, the longer the time for the hydrothermal reaction is, the larger the number average primary particle diameter of the barium titanate particles 23 is.

(Carbon Black Particles)

The carbon black particles 24 are conductive. As such, charge can smoothly move from the carrier particles 20 to the toner particles 10 as a result of the coat layers 22 containing the carbon black particles 24. Thus, the toner particles 10 can be charged to the desired charge amount, thereby achieving formation of images with less fog. Furthermore, variation in charge amount of the toner can be reduced to achieve stable formation of images with desired image density even when the toner concentration in the developer 1 changes.

The carbon black particles 24 have a number average primary particle diameter of preferably at least 10 nm and no greater than 50 nm, and more preferably at least 20 nm and no greater than 40 nm. The carbon black particles 24 have a DBP oil absorption of preferably at least 50 $cm^3$/100 g and no greater than 700 $cm^3$/100 g, and more preferably at least 100 $cm^3$/100 g and no greater than 600 $cm^3$/100 g. The carbon black particles 24 have a BET specific surface area of preferably at least 100 $m^2$/g and no greater than 2000 $m^2$/g, and more preferably at least 100 $m^2$/g and no greater than 200 $m^2$/g or at least 1200 $m^2$/g and no greater than 1500 $m^2$/g.

As a result of the coat layers 22 containing the barium titanate particles 23, the electric resistance of the carrier particles 20 can be moderately low. As such, the electric resistance of the carrier particles 20 can be moderately low even when the amount of the carbon black particles 24 being conductive is small. Since the amount of the carbon black particles 24 can be reduced, occurrence of color turbidity can be inhibited in images formed using the developer 1 containing the carrier particles 20. The amount of the carbon black particles 24 is preferably at least 1 part by mass and no greater than 10 parts by mass relative to 100 parts by mass of the coating resin, more preferably at least 3 parts by mass and no greater than 9 parts by mass, and further preferably at least 3 parts by mass and no greater than 6 parts by mass or at least 6 parts by mass and no greater than 9 parts by mass.

Note that the carrier particles 20 may contain a known additive as necessary. Preferably, the carrier particles 20 have a volume median diameter of at least 25 μm and no greater than 100 μm. The carrier has been descried so far.

[Developer Production Method]

The following describes one example of a method for producing the developer 1 according to the present embodiment. The method for producing the developer 1 according to the present embodiment includes a toner formation process, a carrier formation process, and a process of mixing a toner and a carrier, for example.

<Toner Formation Process>

In the toner formation process, for example, the binder resin, the colorant, the charge control agent, and the releasing agent are mixed to obtain a mixture. The mixture is melt-kneaded to obtain a melt-kneaded product. The melt-knead product is pulverized to obtain a pulverized product. The pulverized product is classified to obtain the toner mother particles 11. The toner mother particles 11 and the external additive particles 12 (the large-diameter silica particles 13 and the optional external additive particles 14) are mixed using a mixer. Through mixing, the external additive particles 12 are attached to the surfaces of the toner mother particles 11. Thus, a toner containing the toner particles 10 is obtained. The external additive particles 12 are mixed preferably under a condition that the external additive particles 12 are not entirely buried in the toner mother particles 11. The external additive particles 12 are attached to the surfaces of the toner mother particles 11 by physical bond (physical force) rather than chemical bond.

<Carrier Formation Process>

In the carrier formation process, the coat layers 22 are formed on the surfaces of the carrier cores 21 to obtain a carrier containing the carrier particles 20. For example, a coating liquid containing the coating resin, the barium titanate particles 23, and the optional carbon black particles 24 is sprayed on the carrier cores 21 in a fluid layer. >Next, the carrier cores 21 on which the coating liquid has been sprayed are heated at a first specific temperature (also referred to below as a specific drying temperature) to dry the coating liquid attached to the surfaces of the carrier cores 21, thereby obtaining a dried product. Next, the dried product is heated at a second specific temperature (also referred to below as a specific baking temperature) using an electric furnace to harden the coating resin contained in the coating liquid on the surfaces of the carrier cores 21. Thus, the coat layers 22 are formed on the surfaces of the carrier cores 21. Preferably, the specific drying temperature is at least 70° C. and no greater than 80° C. Preferably, the specific baking temperature is at least 200° C. and no greater than 300° C.

The coverage rate of the carrier cores 21 and the shape factor of the carrier cores 21 can be adjusted for example by changing the specific drying temperature and the amount of the coating liquid sprayed on the carrier cores 21. A higher specific drying temperature dries the coating liquid before the coating liquid spreads over the entire surface of the carrier cores 21. Therefore, at a higher specific drying temperature, the coat layers 22 are formed locally on the surfaces of the carrier cores 21 rather than over the entire surface thereof, which tends to reduce the coverage rate of the carrier cores 21 and increase the shape factor of the carrier cores 21. Furthermore, the smaller the amount of the coating liquid sprayed on the carrier cores 21 is, the more the coverage rate tends to reduce.

<Process of Mixing Toner and Carrier>

In the process of mixing a toner and a carrier, the toner and the carrier are mixed using a mixer to obtain the developer 1.

Examples

The following provides more specific description of the present invention through use of examples. However, the present invention is not limited to the scope of the examples.

<Carrier Preparation>

Carriers (CA-1) to (CA-23) and (CB-1) to (CB-8) were prepared. The compositions of these carriers are shown in Tables 3 to 6 described later. The carriers (CA-1) to (CA-23) and (CB-1) to (CB-8) were used for preparing the developers (A-1) to (A-23) and (B-1) to (B-8), respectively. To aid understanding, carriers with the same composition are presented in Tables 3 to 6 with different carrier numbers corresponding to the numbers of the developers.

(Preparation of Carrier (CA-1))

Using a homomixer, 60.00 g of a silicone resin solution ("KR-255", product of Shin-Etsu Chemical Co., Ltd., solid concentration: 50% by mass, solid content amount: 30.00 g), 1.50 g of barium titanate ("BT-01", product of SAKAI CHEMICAL INDUSTRY CO., LTD., barium titanate produced by the hydrothermal synthesis, number average primary particle diameter: 102 nm), 0.90 g of carbon black ("KETJEN BLACK EC300J", product of Lion Specialty Chemicals Co., Ltd.), and 240.00 g of toluene were mixed to obtain a coating liquid.

While 5000 g of carrier cores are allowed to flow, the coating liquid was sprayed on the carrier cores using a fluidized bed coating apparatus ("FD-MP-01 D", product of Powrex Corporation). Thus, carrier cores coated with the coating liquid were obtained. The coating conditions included a supply air temperature (corresponding to the specific drying temperature described in the embodiment) of 75° C., supply air flow rate of 0.3 $m^3$/min, and a rotor rotational speed of 400 rpm. The carrier cores used were manganese ferrite cores (product of DOWA IP CREATION CO., LTD., volume median diameter: 20.3 μm, saturation magnetization: 67 emu/g). The carrier cores coated with the coating liquid were baked at a temperature of 200° C. (corresponding to the specific baking temperature described in the embodiment) for 1 hour using an electric furnace. In the manner described above, coat layers were formed on the surfaces of the carrier cores to obtain a carrier (CA-1).

(Preparation of Carriers (CA-2) to (CA-23) and (CB-1) to (CB-8))

Carriers (CA-2) to (CA-23) and (CB-1) to (CB-8) were prepared according to the same method as that for preparing the carrier (CA-1) in all aspects other than the following changes. That is, the coating resin solutions shown in Tables 3 to 6 were used in amounts to give the solid content amounts shown in Tables 3 to 6. Barium titanates with number average primary particle diameters shown in Tables 3 to 6 produced by the methods shown in Tables 3 to 6 were used in amounts shown in Tables 3 to 6. The carbon blacks shown in Tables 3 to 6 were used in amounts shown in Tables 3 to 6. Carrier cores with volume median diameters shown in Tables 3 to 6 and saturation magnetizations shown in Tables 3 to 6 were used. The supply air temperature as one of the coating conditions was adjusted to give the coverage rate of the carrier cores shown in Tables 3 to 6. Note that the higher the supply air temperature is, the lower the coverage rate of the carrier cores is.

With respect to the coating resin and carbon blacks shown in Tables 3 to 6, commercially available products are used, and details thereof will be described later in the explanation of the terms in Tables 3 to 6. The barium titanates with number average primary particle diameters shown in Tables 3 to 6 produced by the methods shown in Tables 3 to 6 used were those described below. Any types of the carrier cores with the volume median diameters shown in Tables 3 to 6 and the saturation magnetizations shown in Tables 3 to 6 were manganese ferrite cores produced by DOWA IP CREATION CO., LTD.

- Barium titanate (production method: hydrothermal synthesis, number average primary particle diameter: 102 nm): "BT-01" produced by SAKAI CHEMICAL INDUSTRY CO., LTD.
- Barium titanate (production method: hydrothermal synthesis, number average primary particle diameter: 304 nm): "BT-03" produced by SAKAI CHEMICAL INDUSTRY CO., LTD.
- Barium titanate (production method: hydrothermal synthesis, number average primary particle diameter: 495 nm): "BT-05" produced by SAKAI CHEMICAL INDUSTRY CO., LTD.

Barium titanate (production method: hydrothermal synthesis, number average primary particle diameter: 76 nm): particle size adjusted product produced by SAKAI CHEMICAL INDUSTRY CO., LTD.

Barium titanate (production method: hydrothermal synthesis, number average primary particle diameter: 687 nm): "BT-07" produced by SAKAI CHEMICAL INDUSTRY CO., LTD.

Barium titanate (production method: oxalate method, number average primary particle diameter: 304 nm): 0.3-μm product of "PARUSERAMU BT" produced by NIPPON CHEMICAL INDUSTRIAL CO., LTD.

<Silica Particles>

The following silica particles were prepared for use as external additives for toners.

Large-diameter silica particles (S1): number average primary particle diameter of 40 nm Large-diameter silica particles (S2): number average primary particle diameter of 60 nm Large-diameter silica particles (S4): number average primary particle diameter of 100 nm Large-diameter silica particles (S5): number average primary particle diameter of 120 nm Ultra-large-diameter silica particles (S6): number average primary particle diameter of 150 nm Large-diameter silica particles (S3): "X-24-9600A-80" produced by Shin-Etsu Chemical Co., Ltd. (sol-gel silica, number average primary particle diameter 80 nm, bulk density 0.44 g/cm$^3$, true specific gravity 1.8, BET Specific surface area 40 m$^2$/g, degree of hydrophobicity of 67%)

Small-diameter silica particles: "AEROSIL (registered Japanese trademark) REA90" produced by Nippon Aerosil Co., Ltd. (fumed silica rendered positively chargeable and hydrophobic by surface treatment, number average primary particle diameter 20 nm)

The large-diameter silica particles (S1), (S2), (S4), (S5), and (S6) were all particle size adjusted products of "CAB-O-SIL (registered Japanese trademark) TG-5110" produced by Cabot Corporation. "CAB-O-SIL (registered Japanese trademark) TG-5110" was fumed silica surface-treated with hexamethyldisilazane.

<Synthesis of Non-Crystalline Polyester Resin (PS1)>

A non-crystalline polyester resin (PS1) for used as a binder resin of toner mother particles of the toners was synthesized by the following method. First, a reaction vessel equipped with a thermometer (thermocouple), a dewatering conduit, a nitrogen inlet tube, and a stirring device (stirring impeller) was set in an oil bath. Into the reaction vessel, 1575 g of a bisphenol A propylene oxide adduct (BPA-PO), 163 g of a bisphenol A ethylene oxide adduct (BPA-EO), 377 g of fumaric acid, and 4 g of a catalyst (dibutyltin oxide) were added. Subsequently, after a nitrogen atmosphere was created in the reaction vessel, the internal temperature of the reaction vessel was raised to 220° C. using the oil bath while stirring the contents thereof. The contents of the reaction vessel were polymerized for 8 hours under conditions of the nitrogen atmosphere and a temperature of 220° C. while by-product water was removed. Subsequently, after the internal pressure of the reaction vessel was reduced, the contents of the reaction solution were further polymerized for 1 hour under conditions of the reduced pressure atmosphere (pressure: 60 mmHg) and a temperature of 220° C. Subsequently, after the internal temperature of the reaction vessel was reduced to 210° C., 336 g of trimellitic anhydride was added into the reaction vessel. Thereafter, the contents of the reaction vessel were caused to react under conditions of the reduced pressure atmosphere (pressure: 60 mmHg) and a temperature of 210° C. The reaction time for the reaction was adjusted so that the non-crystalline polyester resin (PS1) being a reaction product had the following physical properties. Thereafter, the reaction product was taken out of the reaction vessel and cooled to obtain a non-crystalline polyester resin (PS1) with the following physical properties. Note that the resultant polyester resin (PS1) was determined to be non-crystalline because no clear endothermic peak was observed on the endothermic curve plotted using a differential scanning calorimeter and no clear melting point was determined.

(Physical Properties of Non-Crystalline Polyester Resin (PS-1))

Softening point (Tm): 100° C.

Glass transition point (Tg): 50° C.

Mass average molecular weight (Mw): 30,000

Acid value: 15 mgKOH/g

Hydroxyl value: 30 mgKOH/g

<Toner Preparation>

Toners (TA-1) to (TA-23) and (TB-1) to (TB-8) were prepared. The compositions of these toners are shown in Tables 6 to 8 described later. Note that the toners (TA-1) to (TA-23) and (TB-1) to (TB-8) were used for preparing the developers (A-1) to (A-23) and (B-1) to (B-8), respectively. To aid understanding, even toners with the same composition are shown in Tables 7 to 10 as toners with different toner numbers corresponding to the numbers of the developers.

(Preparation of Toner (TA-1))

Using an FM mixer ("FM-10B", product of Nippon Coke & Engineering Co., Ltd.), 100 parts by mass of a binder resin, 4 parts by mass of a colorant, 1 part by mass of a charge control agent, and 5 parts by mass of a releasing agent were mixed to obtain a mixture. The binder resin used was the non-crystalline polyester resin (PS1) obtained in <Synthesis of Non-crystalline Polyester Resin (PS1)> described above. The colorant used was a copper phthalocyanine blue pigment (C.I. Pigment Blue 15:3). The charge control agent used was a quaternary ammonium salt ("BONTRON (registered Japanese trademark) P-51", product of ORIENT CHEMICAL INDUSTRIES CO., LTD.). The releasing agent used was a carnauba wax ("SPECIAL CARNAUBA WAX No. 1", product of S. Kato & Co.). The resultant mixture was melt-kneaded using a twin screw extruder ("MODEL PCM-30", product of Ikegai Corp.) to obtain a melt-kneaded product. The melt-kneaded product was pulverized using a mechanical pulverizer ("TURBO MILL", product of FREUND-TURBO CORPORATION) to obtain a pulverized product. The pulverized product was classified using a classifying apparatus ("ELBOW-JET", product of Nittetsu Mining Co., Ltd.). Through the above, toner mother particles in a powder state with a volume median diameter of 6.8 μm were obtained.

Using an FM mixer ("FM-10B", product of Nippon Coke & Engineering Co., Ltd.), 100.0 parts by mass of the toner mother particles, 1.5 parts by mass of the small-diameter silica particles, and 0.4 parts by mass of the large-diameter silica particles (S1) were mixed for 5 minutes under a condition of 4,000 rpm. The resultant mixture was sifted using a 200-mesh sieve (opening 75 μm) to obtain a toner (TA-1).

(Preparation of Toners (TA-2) to (TA-23) and (TB-1) to (TB-8))

Toners (TA-2) to (TA-23) and (TB-1) to (TB-8) were prepared according to the same method as that for preparing the toner (TA-1) in all aspects other than that the large-diameter silica particles shown in Tables 7 to 10 were used in amounts shown in Tables 7 to 10.

<Developer Preparation>

Using a shaker mixer ("TURBULA (registered Japanese trademark) MIXER T2F", product of Willy A. Bachofen AG (WAB)), 6 parts by mass of any of the toners and 100 parts by mass of any of the carriers were mixed for 30 minutes to obtain a developer with a toner concentration of 6% by mass. Note that the toners and the carriers shown in Tables 7 to 10 were used in the developer preparation. For example, the toner (TA-1) and the carrier (CA-1) shown in the column titled "Developer (A-1)" in Table 7 were used in the preparation of the developer (A-1).

<Saturation Magnetization Measurement>

The saturation magnetization of each type of the carrier cores was measured under a condition of an external magnetic field of 3000 (unit: Oe) using a high-sensitivity vibrating sample magnetometer ("VSM-P7", product of Toei Industry Co., Ltd.). The measurement results are shown below in Tables 3 to 6.

<Volume Median Diameter Measurement>

The volume median diameter of each type of the carrier cores was measured using a laser diffraction/scattering type particle size distribution analyzer ("LA-950", product of HORIBA, Ltd.). The measurement results are shown below in Tables 3 to 6.

<Number Average Primary Particle Diameter Measurement>

The number average primary particle diameters of each type of the barium titanate particles, each type of the small-diameter silica particles, and each type of the large-diameter silica particles were measured using a scanning electron microscope ("JSM-7600F", product of JEOL Ltd., field emission scanning electron microscope). In the number average primary particle diameter measurement, the equivalent circle diameters (Heywood diameters: diameters of circles having the same areas as projected areas of primary particles) of 100 primary particles were measured and a number average thereof was obtained. Tables 3 to 6 show the results of the number average primary particle diameter measurement for the barium titanate particles. Tables 7 to 10 show the results of the number average primary particle diameter measurement for the small-diameter silica particles and the large-diameter silica particles.

<Determination of Coverage Rate>

(Photographing of Backscattered Electron Image of Surface of Carrier Particle)

Conductive tape was fixed to a SEM sample stage with the adhesive side thereof facing upward. The carrier particles of any of the carriers were sprayed on the adhesive side of the conductive tape. Next, excess carrier particles were removed from the adhesive side thereof by air blowing. Next, the carrier particles were fixed to the conductive tape by covering the adhesive side thereof with powder paper and applying a load to the carrier particles through the powder paper. Next, the powder paper was peeled off from the adhesive side of the conductive tape. Thus, a sample was obtained that included the conductive tape and the carrier particles dispersed on and fixed to the adhesive side of the conductive tape. Using a field emission scanning electron microscope (FE-SEM, "JSM-7600F", product of JEOL Ltd.), backscattered electron images (surface photographed images) of the surfaces of the carrier particles of the obtained sample were photographed. The FE-SEM setting conditions included the followings.

(FE-SEM Setting Conditions for Coverage Rate Measurement)

Accelerating voltage of electron beam during photographing: 1 kV

Measurement mode: BE mode (mode for primarily detecting backscattered electron signals)

Magnification: 500×

Emission current: 10 μA

Irradiation current: 450 pA

Photographing mode: integration (256 times)

(Image Analysis)

The photographed images (surface photographed images of the carrier particles) were analyzed using image analysis software ("WinROOF", product of MITANI CORPORATION). Specifically, histograms with the number of pixels on the vertical axis and the brightness on the horizontal axis were each created from a corresponding one of the images. Each of the created histograms included a low brightness peak $P_{BG1}$ corresponding to the conductive tape in the image, a medium brightness peak $P_{CL1}$ corresponding to the coating layer in the image, and a high brightness peak $P_{CC1}$ corresponding to the carrier core in the image. Next, the image was binarized using a brightness at the minimum value between the peak $P_{BG1}$ and the peak $P_{CL1}$ as a threshold. Thus, each of the images was divided into a conductive tape region and a combination region of a covered region and a non-covered region. The covered region corresponds to a region indicated by the medium brightness peak $P_{CL1}$ derived from the coat layer. The non-covered region corresponds to a region indicated by the high brightness peak $P_{CC1}$ derived from an exposed part of the carrier core and not covered with the coat layer. Next, area calculation was carried out based on the binarized image to calculate a total area ($A_{CL1}+A_{CC1}$) of the covered region and the non-covered region of the image. Next, the binarization condition was changed by setting a threshold of the brightness at the minimum value between the peak $P_{CL1}$ and the peak $P_{CC1}$. Thus, the combination region of the covered region and the non-covered region was divided into the covered region and the non-covered region. Thereafter, an area ($A_{CC1}$) of the non-covered region and an area ($A_{CL1}$) of the covered region were calculated. Next, a coverage rate of the carrier core was obtained for the surface photographed image of the one carrier particle based on the measured values using a formula "(coverage rate)=100×(area ($A_{CL1}$) of covered region)/(area of surface of carrier core)=100×(area ($A_{CL1}$) of covered region)/(total area ($A_{CL1}+A_{CC1}$) of covered region and non-covered region)". With respect to each of the surface photographed images of 100 carrier particles, a coverage rate of the carrier core was obtained. Based on the coverage rates of the 100 carrier cores, the coverage rate (number average of coverage rates) of the carrier cores was obtained. Tables 3 to 6 show the coverage rates of the carrier cores.

<BET Specific Surface Area Measurement>

Nitrogen was adsorbed onto the surface of a sample (each carrier) using an automatic specific surface area measuring device ("MACSORB MODEL 1208", product of Mountech Co., Ltd.), and the BET specific surface area of the sample was measured by the flow method (BET single point method). In detail, the mass of an empty cell was measured. Next, 9 g of the sample was loaded in the cell so as not to be attached to the inner wall of the cell. Nitrogen was allowed to flow into the cell loaded with the sample at a temperature of 45° C. for 30 minutes while the flow rate of the nitrogen was adjusted to 25 mL/min using a flow meter. In the manner as above, the sample was degassed. Next, the cell was cooled for 2 minutes and measurement using the automatic specific surface area measuring device was then started. After the measurement start, adsorption was carried by immersing the cell in liquid nitrogen in a Dewar bottle and desorption was then carried out by returning the cell from the Dewar bottle to the atmosphere. Automatic measurement during the desorption measured the actual surface area of the sample. A BET specific surface area (unit: $m^2/g$) of the sample was obtained based on the measured values using a formula "(specific surface area)=(actual surface area of sample)/(mass of sample)". The measurement results are shown in Tables 3 to 6.

<Measurement of Shape Factor>

First, the volume median diameter of the carrier particles is measured using a laser diffraction/scattering particle size distribution analyzer ("LA-950", product of HORIBA, Ltd.). The measurement values were taken as actual measured diameters (unit: μm) of the carrier particle.

Next, the true specific gravity (unit: $g/cm^3$) of the carrier particles is measured using a dry automatic density meter ("ACCUPYC II 1340 SERIES", product of Micromeritics Instrument Corporation, accessories: Multivolume kit, measurement principle: dry density measurement using constant volume expansion method). The calculated carrier particle diameter (unit: μm) was determined using the formula "calculated carrier particle diameter=6/(true specific gravity of carrier particles×BET specific surface area of carrier particles)". This calculation was based on the measured true specific gravity of the carrier particles and the BET specific surface area of the carrier particles measured in <Measurement of BET Specific Surface Area> above.

Next, the shape factor of the carrier particles was determined from the formula "shape factor of carrier particles=actual carrier particle diameter/calculated carrier particle diameter". The determined shape factors of the carrier particles are shown in Tables 3 to 6.

<Calculation of Ratio (Coverage Rate/Shape Factor)>

The ratio (coverage rate/shape factor) was determined using the formula "ratio (coverage rate/shape factor)=coverage rate of carrier cores/shape factor of carrier particles)". The calculation was based on the coverage rate of carrier cores measured in <Measurement of Coverage Rate> above and the shape factor of the carrier particles measured in <Measurement of Shape Factor> above. The determined ratios (coverage rate/shape factor) are shown in Tables 3 to 6.

<Evaluation>

An evaluation apparatus (prototype produced by KYOCERA Document Solutions Japan Inc.) having the following configuration was used for evaluation of each developer. The developer was loaded into a development device for cyan color of the evaluation apparatus, and a toner for replenishment use was loaded into a toner container for cyan color thereof.

(Configuration of Evaluation Apparatus)

- Sheet conveyance speed: 55 sheets/min
- Surface profile of developer bearing member: knurled profile
- Outer diameter of developer bearing member: 20-mm diameter
- Recesses in developer bearing member: recesses in 80 lines in circumferential direction
- Restriction blade: magnetic blade constituted by SUS430
- Thickness of restriction blade: 1.5 mm
- Amount of developer transported: 345 $g/m^2$
- Development roller peripheral speed/drum peripheral speed: 1.8 (trail in opposite positions)
- Distance between photosensitive member and development roller: 0.375 mm
- Photosensitive member: amorphous silicon photosensitive member
- Bias applied to development roller: AC bias, duty 50%, rectangular wave form, Vpp 1125 v, frequency 10 KHz
- Toner charging polarity: positive chargeability Using the evaluation apparatus, durable printing of printing A4-size image on 100,000 sheets of paper was carried out under the printing conditions (specifically, conditions of a printing environment, a printing mode, and an image printing rate) shown in Table 11.

The printing environments shown in Table 11 were as follows.

- LL environment: environment at a temperature of 10° C. and a relative humidity of 15%
- NN environment: environment at a temperature of 22° C. and a relative humidity of 50%
- HH environment: environment at a temperature of 32.5° C. and a relative humidity of 80%

The printing modes shown in Table 11 were as follows.

- Consecutive mode: mode for consecutive sheet printing
- 5-sheet intermittent mode: mode for repeating printing pattern of 5-sheet printing and 12-second printing stop The images with printing rates shown in Table 11 were as follows.

- 2%: character image at a printing rate of 2%
- 5%: character image at a printing rate of 5%
- 20%: character image at a printing rate of 20%
- 50%: character image at a printing rate of 50%

Note that "Start" in Table 11 indicates from which sheet of the 100,000 sheets of paper printing under the corresponding printing conditions starts. Furthermore, "Image evaluation timing" indicates that image evaluation was carried out after image printing on which sheet out of 100,000 sheets of paper has been done. In addition, for changing the printing environment, the evaluation apparatus was left to stand for 24 hours in the changed printing environment and the durable printing was resumed then. The evaluation results of the developers are shown in Tables 7 to 10.

(Image Density Evaluation Method)

First, a solid image (A4 size) was printed on one sheet of paper using the evaluation apparatus in the NN environment and the printed sheet was taken to be a first evaluation sheet. Next, the aforementioned durable printing was carried out. In the durable printing, a solid image (A4 size) was printed on one sheet of paper with each timing shown in Table 11 using the evaluation apparatus. The printed sheet was taken to be a second evaluation sheet. The image density of each solid image printed on the first evaluation sheet and the second evaluation sheets was measured using a reflectance densitometer ("RD-19I", product of X-Rite Inc.). Thereafter, a decrease width in image density was calculated using a formula "(decrease width in image density)=(image density of solid image printed on first evaluation sheet)−(image density of solid image printed on second evaluation sheet)". A decrease width in image density for each of the second evaluation images was calculated. The maximum value of the calculated decrease widths was taken to be an evaluation value. The evaluation value was rated according to the following criteria. A smaller decrease width in image density indicates that images with desired image density can be formed more stably. Cases rated as A, B, or C in the evaluation were considered passed, and cases rated as D were considered failed.

(Evaluation Criteria of Image Density)

A: Decrease width in image density of less than 0.2

B: decrease width in image density of at least 0.2 and less than 0.3

C: decrease width in image density of at least 0.3 and less than 0.4

D (poor): decrease width in image density of 0.4 or more (Fog Resistance Evaluation Method)

The aforementioned durable printing was carried out. In the durable printing, a blank image (A4 size) was printed on one sheet of paper with each timing shown in Table 11 using the evaluation apparatus. The printed sheets were each taken to be an evaluation sheet. The reflection density of a blank area of the evaluation sheet was measured using a white light meter ("TC-6DS", product of Tokyo Denshoku Co., Ltd.). Thereafter, a fog density was calculated using a formula "(fog density)=(reflection density of blank area)−(reflection density of unprinted sheet)". Fog density of each of the evaluation sheets was calculated. The maximum value of the calculated fog densities was taken to be an evaluation value. The evaluation value was rated according to the following criteria. Cases rated as A or B in the evaluation were considered passed, and cases rated as C were considered failed.

(Evaluation Criteria of Fog Density)

A: fog density of less than 0.010

B: fog density of at least 0.010 and less than 0.020

C (poor): fog density of 0.020 or more (Method for Evaluating Inhibition of Occurrence of Carrier Development)

The aforementioned durable printing was carried out. In the durable printing, a blank image (A4 size) was printed on one sheet of paper with each timing shown in Table 11 using the evaluation apparatus. The printed sheet was taken to be an evaluation sheet. The blank image printed on the evaluation sheet was observed using a loupe with a magnification of 25×. The numbers of carriers present in regions each with an area of $cm^2$ in the blank image was counted. The number of carriers present in each of 10 regions (specifically, upstream 3 regions, central 4 regions, and downstream 3 regions in terms of a sheet travelling direction) of the blank image printed on each evaluation sheet was counted. Thereafter, the number (unit: occurrences/$cm^2$) of occurrences of carrier development was obtained using a formula "(number of occurrences of carrier development)=(total number of carriers present in 10 regions)/(total area of 10 regions)=(total number of carriers present in 10 regions)/100". The number of occurrences of carrier development was calculated for each of the evaluation sheets. The maximum value of the calculated numbers of occurrences of carrier development was taken to be an evaluation value. The evaluation value was rated according to the following criteria. Cases rated as A, B, or C in the evaluation were considered passed, and cases rated as D were considered failed.

(Evaluation Criteria of Inhibition of Occurrence of Carrier Development)

A: number of occurrences of carrier development of less than 0.1 occurrences/$cm^2$ B: number of occurrences of carrier development of at least 0.1 occurrences/$cm^2$ and less than 0.3 occurrences/$cm^2$ C: number of occurrences of carrier development of at least 0.3 occurrences/$cm^2$ and less than 1.0 occurrences/$cm^2$ D (poor): number of occurrences of carrier development of 1.0 occurrences/$cm^2$ or more (Method for Evaluating Inhibition of Decrease in Texture)

First, a halftone image (band-shaped image with a printing rate of 50%) was printed on one sheet of paper using the evaluation apparatus in the NN environment and the printed sheet was taken to be a first evaluation sheet. Next, the aforementioned durable printing was carried out. In the durable printing, a halftone image (band-shaped image with a printing rate of 50%) was printed on one sheet of paper with each timing shown Table 11 using the evaluation apparatus. The printed sheets were each taken to be a second evaluation sheet. The texture of the halftone images printed on the first evaluation sheet and the second evaluation sheet was observed with the naked eye. By doing so, it was confirmed to what extent the texture of the halftone image printed on the second evaluation sheet was decreased compared to the texture of the halftone image printed on the first evaluation sheet. Of all the second evaluation sheets, the evaluation sheet with texture of the halftone image decreased the worst was evaluated according to the following criteria. Cases rated as A, B, or C in the evaluation were considered passed, and cases rated as D were considered failed.

(Evaluation Criteria of Inhibition of Decrease in Texture)

A: No decrease in texture occurred at all.

B: Decrease in texture occurred to some extent.

C: Decrease in texture occurred to the extent that there is no problem involved in actual use D (poor): Decrease in texture occurred that is noticeable to the extent that it involves a problem in actual use.

(Evaluation Method of Inhibition of Occurrence of Image Defects Resulting from Cleaning Failure)

The aforementioned durable printing was carried out. In the durable printing, a character image with a printing rate of 5% was printed on one sheet of paper with each timing shown in Table 11 using the evaluation apparatus. The printed sheets each were taken to be an evaluation sheet. The character image printed on each evaluation sheet was observed with the naked eye to confirm the occurrence or non-occurrence of image defects resulting from cleaning failure. Note that the image defects resulting from cleaning failure are image defects in which a thin line parallel to the sheet travelling direction appears. Of all the evaluation sheets, the evaluation sheet in which image defects resulting from cleaning failure occurred the most was evaluated according to the following criteria. Cases rated as A, B, or C in the evaluation were considered passed, and cases rated as D were considered failed.

(Evaluation Criteria of Inhibition of Occurrence of Image Defects Resulting from Cleaning Failure)

A: No image defects resulting from cleaning failure occurred at all.

B: Some image defects resulting from cleaning failure occurred.

C: Image defects resulting from cleaning failure occurred to the extent that there is no problem involved in actual use.

D (poor): Image defects resulting from cleaning failure occurred that are noticeable to the extent that they involve a problem in actual use.

The meanings of the terms used below in Tables 3 to 10 are explained next. The terms in Tables 3 to 10 mean as follows.

Core: carrier cores $D_{50}$: volume median diameter

Solid content amount: solid content amount of coating resin The solid content amount of the coating resin is calculated using a formula "[solid content amount (unit: part by mass) of coating resin]=[amount (unit:

part by mass) of silicone resin solution]×[solid concentration (unit: % by mass) of silicone resin solution]/100".

Resin/core: resin/core rate (unit: % by mass) The resin/core rate was calculated using a formula "[resin/core rate (unit: % by mass)]=100×[mass (unit: parts by mass) of coating resin]/[mass (unit: parts by mass) of carrier cores]=100×[solid content amount (unit parts by mass) of silicone resin solution]/[mass (unit: parts by mass) of carrier cores]".

wt %: % by mass

Part: parts by mass

BT: barium titanate particles

Method: barium titanate particle production method

Hydrothermal: hydrothermal synthesis

Oxalate: oxalate method

Amount ratio: content of barium titanate particles to 100 parts by mass of coating resin Diameter: number average primary particle diameter CB: carbon black particles Coat layer/core: coat layer/core rate The coat layer/core rate is calculated using a formula "[coat layer/core rate (unit: % by mass)]=100×[mass (unit: parts by mass) of coat layers]/[mass (unit: part by mass) of carrier cores]= 100×[mass (unit: part by mass) of solid content of coating liquid]/[mass (unit: part by mass) of carrier cores]=100×{[solid content amount (unit: part by mass) of silicone resin solution]+[mass (unit: part by mass) of barium titanate]+[mass (unit: part by mass) of carbon black]}/[mass (unit: part by mass) of carrier cores]".

Coverage rate: coverage rate of carrier cores

BET: BET specific surface area of carrier particles

Factor: shape factor of carrier particles

Coverage rate/factor: ratio (coverage rate/shape factor)

KR-255: silicone resin solution ("KR-255", product of Shin-Etsu Chemical Co., Ltd., solid content: methylphenyl silicone resin, solid concentration: 50% by mass)

KR-301: silicone resin solution ("KR-301", product of Shin-Etsu Chemical Co., Ltd., solid content: methylphenyl silicone resin, solid concentration: 40% by mass)

ES-1001N: silicone resin solution ("ES-1001N", product of Shin-Etsu Chemical Co., Ltd., solid content: epoxy resin modified silicone resin, solid concentration: 45% by mass).

EC: carbon black ("KETJEN BLACK EC-300J", product of Lion Specialty Chemicals Co., Ltd., conductive carbon black, DBP oil absorption: 360 $cm^3$/100 g, BET specific surface area: 1270 $m^2$/g, number average primary particle diameter: 39.5 nm)

MA: carbon black ("MITSUBISHI (registered Japanese trademark) CARBON BLACK MA100", product of Mitsubishi Chemical Corporation, DBP oil absorption: 100 $cm^3$/100 g, BET specific surface area: 110 $m^2$/g, number average primary particle diameter: 24 nm)

Small-diameter silica: small-diameter silica particles

Large-diameter silica: large-diameter silica particles

FD: fog density

Fog: rating of fog resistance

Carrier development: rating of inhibition of occurrence of carrier development

Texture: rating of inhibition of decrease in texture

Image density: rating of image density

Cleaning: rating of inhibition of occurrence of image defects resulting from cleaning failure -: non-containment of corresponding component

TABLE 3

| | | Core | | Coat layer | | | | | | |
|---|---|---|---|---|---|---|---|---|---|---|
| | | | | Coating resin | | | BT | | | |
| Developer | Carrier | $D_{50}$ [μm] | Saturation magnetization [emu/g] | Type | Solid content [g] | Resin/ Core [wt %] | Method | Amount [g] | Amount ratio [part] | Diameter [nm] |
| A-1 | CA-1 | 20.3 | 67 | KR-255 | 30.00 | 0.60 | Hydrothermal | 1.50 | 5 | 102 |
| A-2 | CA-2 | 34.7 | 80 | KR-255 | 35.00 | 0.70 | Hydrothermal | 1.75 | 5 | 304 |
| A-3 | CA-3 | 58.8 | 87 | KR-255 | 40.00 | 0.80 | Hydrothermal | 2.00 | 5 | 495 |
| A-4 | CA-4 | 20.3 | 67 | KR-255 | 95.00 | 1.90 | Hydrothermal | 11.40 | 12 | 304 |
| A-5 | CA-5 | 34.7 | 80 | KR-255 | 10.00 | 0.20 | Hydrothermal | 1.20 | 12 | 495 |
| A-6 | CA-6 | 58.8 | 87 | KR-255 | 10.00 | 0.20 | Hydrothermal | 1.20 | 12 | 102 |
| A-7 | CA-7 | 20.4 | 80 | KR-255 | 95.00 | 1.90 | Hydrothermal | 19.00 | 20 | 102 |
| A-8 | CA-8 | 35.2 | 87 | KR-255 | 115.00 | 2.30 | Hydrothermal | 23.00 | 20 | 304 |

| | Coat layer CB | | Coat layer/ | Coverage | | | Coverage |
|---|---|---|---|---|---|---|---|
| Developer | Type | Amount [g] | Core [wt %] | rate [%] | BET [$m^2$/g] | Factor | rate/ Factor |
| A-1 | EC | 0.90 | 0.65 | 81.0 | 0.5 | 7.9 | 10.3 |
| A-2 | EC | 2.10 | 0.78 | 93.5 | 0.9 | 25.0 | 3.7 |
| A-3 | EC | 3.60 | 0.91 | 99.6 | 1.1 | 52.4 | 1.9 |
| A-4 | EC | 5.70 | 2.24 | 93.5 | 3.0 | 50.5 | 2.0 |
| A-5 | EC | 0.90 | 0.24 | 81.0 | 0.3 | 7.6 | 10.6 |
| A-6 | EC | 0.30 | 0.23 | 93.5 | 0.5 | 24.1 | 3.9 |
| A-7 | EC | 8.55 | 2.45 | 93.5 | 1.4 | 23.3 | 4.0 |
| A-8 | EC | 3.45 | 2.83 | 99.6 | 1.7 | 48.8 | 2.0 |

TABLE 4

| Developer | Carrier | Core D50 [μm] | Core Saturation magnetization [emu/g] | Coat layer: Coating resin Type | Coating resin Solid content [g] | Coating resin Resin/Core [wt %] | BT Method | BT Amount [g] | BT Amount ratio [part] | BT Diameter [nm] |
|---|---|---|---|---|---|---|---|---|---|---|
| A-9 | CA-9 | 59.5 | 67 | KR-255 | 3.50 | 0.07 | Hydrothermal | 0.70 | 20 | 495 |
| A-10 | CA-10 | 20.7 | 87 | KR-255 | 95.00 | 1.90 | Hydrothermal | 25.65 | 27 | 495 |
| A-11 | CA-11 | 35.5 | 67 | KR-255 | 110.00 | 2.20 | Hydrothermal | 29.70 | 27 | 102 |
| A-12 | CA-12 | 59.7 | 80 | KR-255 | 3.50 | 0.07 | Hydrothermal | 0.95 | 27 | 304 |
| A-13 | CA-13 | 20.4 | 80 | KR-255 | 95.00 | 1.90 | Hydrothermal | 33.25 | 35 | 495 |
| A-14 | CA-14 | 35.2 | 87 | KR-255 | 10.00 | 0.20 | Hydrothermal | 3.50 | 35 | 102 |
| A-15 | CA-15 | 59.5 | 67 | KR-255 | 10.00 | 0.20 | Hydrothermal | 3.50 | 35 | 304 |
| A-16 | CA-16 | 20.7 | 87 | KR-255 | 30.00 | 0.60 | Hydrothermal | 13.50 | 45 | 304 |

| Developer | Coat layer CB Type | Coat layer CB Amount [g] | Coat layer/Core [wt %] | Coverage rate [%] | BET [m²/g] | Factor | Coverage rate/Factor |
|---|---|---|---|---|---|---|---|
| A-9 | EC | 0.21 | 0.09 | 81.0 | 0.1 | 7.4 | 11.0 |
| A-10 | EC | 5.70 | 2.53 | 93.5 | 1.3 | 22.8 | 4.1 |
| A-11 | EC | 9.90 | 2.99 | 99.6 | 1.6 | 47.8 | 2.1 |
| A-12 | EC | 0.11 | 0.09 | 81.0 | 0.1 | 7.2 | 11.3 |
| A-13 | EC | 2.85 | 2.62 | 93.5 | 2.8 | 47.0 | 2.1 |
| A-14 | EC | 0.60 | 0.28 | 81.0 | 0.2 | 7.1 | 11.4 |
| A-15 | EC | 0.90 | 0.29 | 93.5 | 0.5 | 22.4 | 4.2 |
| A-16 | EC | 2.70 | 0.92 | 81.0 | 0.4 | 7.1 | 11.5 |

TABLE 5

| Developer | Carrier | Core D50 [μm] | Core Saturation magnetization [emu/g] | Coat layer: Coating resin Type | Coating resin Solid content [g] | Coating resin Resin/Core [wt %] | BT Method | BT Amount [g] | BT Amount ratio [part] | BT Diameter [nm] |
|---|---|---|---|---|---|---|---|---|---|---|
| A-17 | CA-17 | 35.5 | 67 | KR-255 | 30.00 | 0.60 | Hydrothermal | 13.50 | 45 | 495 |
| A-18 | CA-18 | 59.7 | 80 | KR-255 | 40.00 | 0.80 | Hydrothermal | 18.00 | 45 | 102 |
| B-1 | CB-1 | 34.7 | 80 | KR-255 | 50.00 | 1.00 | Hydrothermal | 1.50 | 3 | 304 |
| B-2 | CB-2 | 34.7 | 80 | KR-255 | 50.00 | 1.00 | Hydrothermal | 25.00 | 50 | 304 |
| B-3 | CB-3 | 20.4 | 80 | KR-255 | 145.00 | 2.90 | Hydrothermal | 29.00 | 20 | 76 |
| B-4 | CB-4 | 59.7 | 80 | KR-255 | 15.00 | 0.30 | Hydrothermal | 3.00 | 20 | 687 |
| A-19 | CA-19 | 34.7 | 80 | ES-1001N | 10.00 | 0.20 | Hydrothermal | 2.00 | 20 | 304 |

| Developer | Coat layer CB Type | Coat layer CB Amount [g] | Coat layer/Core [wt %] | Coverage rate [%] | BET [m²/g] | Factor | Coverage rate/Factor |
|---|---|---|---|---|---|---|---|
| A-17 | EC | 0.90 | 0.89 | 93.5 | 0.8 | 22.4 | 4.2 |
| A-18 | EC | 2.40 | 1.21 | 99.6 | 1.0 | 46.9 | 2.1 |
| B-1 | EC | 3.00 | 1.09 | 96.2 | 0.2 | 22.8 | 4.1 |
| B-2 | EC | 3.00 | 1.56 | 96.2 | 0.5 | 25.0 | 3.7 |
| B-3 | EC | 8.70 | 3.65 | 96.2 | 0.4 | 23.3 | 4.0 |
| B-4 | EC | 0.90 | 0.38 | 96.2 | 0.8 | 23.3 | 4.0 |
| A-19 | EC | 0.60 | 0.25 | 81.0 | 0.3 | 7.3 | 10.2 |

TABLE 6

| | | Core | | Coat layer | | | | | | |
|---|---|---|---|---|---|---|---|---|---|---|
| | | | | Coating resin | | | BT | | | |
| Developer | Carrier | $D_{50}$ [μm] | Saturation magnetization [emu/g] | Type | Solid content [g] | Resin/ Core [wt %] | Method | Amount [g] | Amount ratio [part] | Diameter [nm] |
| A-20 | CA-20 | 34.7 | 80 | KR-301 | 10.00 | 0.20 | Hydrothermal | 2.00 | 20 | 304 |
| A-21 | CA-21 | 34.7 | 80 | KR-255 | 10.00 | 0.20 | Hydrothermal | 2.00 | 20 | 304 |
| A-22 | CA-22 | 34.7 | 80 | KR-255 | 10.00 | 0.20 | Oxalate | 2.00 | 20 | 304 |
| B-5 | CB-5 | 34.7 | 80 | KR-255 | 10.00 | 0.20 | Hydrothermal | 2.00 | 20 | 304 |
| A-23 | CA-23 | 34.7 | 80 | KR-255 | 10.00 | 0.20 | Hydrothermal | 2.00 | 20 | 304 |
| B-6 | CB-6 | 34.7 | 80 | KR-255 | 10.00 | 4.0 | Hydrothermal | 2.00 | 20 | 304 |
| B-7 | CB-7 | 34.7 | 80 | KR-255 | 10.00 | 0.06 | Hydrothermal | 2.00 | 20 | 304 |
| B-8 | CB-8 | 34.7 | 80 | KR-255 | 10.00 | 0.20 | Hydrothermal | 2.00 | 20 | 304 |

| | Coat layer CB | | Coat layer/ | Coverage | | | Coverage |
|---|---|---|---|---|---|---|---|
| Developer | Type | Amount [g] | Core [wt %] | rate [%] | BET [$m^2$/g] | Factor | rate/ Factor |
| A-20 | EC | 0.60 | 0.25 | 81.0 | 0.3 | 7.3 | 10.2 |
| A-21 | EC | 0.60 | 0.25 | 81.0 | 0.3 | 7.6 | 10.6 |
| A-22 | EC | 0.60 | 0.25 | 81.0 | 0.3 | 7.6 | 10.6 |
| B-5 | EC | 0.60 | 0.25 | 81.0 | 0.2 | 6.7 | 9.4 |
| A-23 | MA | 0.60 | 0.25 | 81.0 | 0.3 | 7.6 | 10.6 |
| B-6 | EC | 0.60 | 5.0 | 100.0 | 1.0 | 59.3 | 1.7 |
| B-7 | EC | 0.60 | 0.08 | 77.0 | 0.5 | 5.5 | 14.1 |
| B-8 | EC | 0.60 | 0.25 | 81.0 | 0.2 | 6.7 | 9.4 |

TABLE 7

| | | | | External additive | | | | | | | | | | | |
|---|---|---|---|---|---|---|---|---|---|---|---|---|---|---|---|
| | | | | Small-diameter silica | | Large-diameter silica | | | | | Carrier | | | |
| | Devel- | | | Diameter | Amount | | Diameter | Amount | Fog | | develop- | Tex- | Image | Clean- |
| | oper | Carrier | Toner | [nm] | [part] | Type | [nm] | [part] | FD | Rating | ment | ture | density | ing |
| Example 1 | A-1 | CA-1 | TA-1 | 20 | 1.5 | S1 | 40 | 0.4 | 0.012 | B | B | A | B | A |
| Example 2 | A-2 | CA-2 | TA-2 | 20 | 1.5 | S1 | 40 | 0.7 | 0.015 | B | A | A | B | A |
| Example 3 | A-3 | CA-3 | TA-3 | 20 | 1.5 | S1 | 40 | 0.7 | 0.017 | B | A | C | B | B |
| Example 4 | A-4 | CA-4 | TA-4 | 20 | 1.5 | S1 | 40 | 1.0 | 0.012 | B | B | A | B | A |
| Example 5 | A-5 | CA-5 | TA-5 | 20 | 1.5 | S2 | 60 | 0.4 | 0.014 | B | A | A | B | B |
| Example 6 | A-6 | CA-6 | TA-6 | 20 | 1.5 | S2 | 60 | 0.7 | 0.018 | B | A | C | B | A |
| Example 7 | A-7 | CA-7 | TA-7 | 20 | 1.5 | S2 | 60 | 0.7 | 0.011 | B | B | A | B | A |
| Example 8 | A-8 | CA-8 | TA-8 | 20 | 1.5 | S2 | 60 | 1.0 | 0.015 | B | A | B | B | A |

TABLE 8

| | | | | External additive | | | | | | | | | | |
|---|---|---|---|---|---|---|---|---|---|---|---|---|---|---|
| | | | | Small-diameter silica | | Large-diameter silica | | | | | Carrier | | | |
| | Devel- | | | Diameter | Amount | | Diameter | Amount | Fog | | develop- | Tex- | Image | Clean- |
| | oper | Carrier | Toner | [nm] | [part] | Type | [nm] | [part] | FD | Rating | ment | ture | density | ing |
| Example 9 | A-9 | CA-9 | TA-9 | 20 | 1.5 | S3 | 80 | 0.4 | 0.017 | B | A | B | B | B |
| Example 10 | A-10 | CA-10 | TA-10 | 20 | 1.5 | S3 | 80 | 0.7 | 0.005 | A | B | B | A | B |
| Example 11 | A-11 | CA-11 | TA-11 | 20 | 1.5 | S3 | 80 | 0.7 | 0.007 | A | A | A | A | A |
| Example 12 | A-12 | CA-12 | TA-12 | 20 | 1.5 | S3 | 80 | 1.0 | 0.008 | A | A | B | A | A |
| Example 13 | A-13 | CA-13 | TA-13 | 20 | 1.5 | S4 | 100 | 0.4 | 0.005 | A | B | A | A | B |
| Example 14 | A-14 | CA-14 | TA-14 | 20 | 1.5 | S4 | 100 | 0.7 | 0.007 | A | A | B | A | A |
| Example 15 | A-15 | CA-15 | TA-15 | 20 | 1.5 | S4 | 100 | 0.7 | 0.008 | A | A | B | A | A |
| Example 16 | A-16 | CA-16 | TA-16 | 20 | 1.5 | S4 | 100 | 1.0 | 0.006 | A | B | B | A | A |

TABLE 9

| | Developer | Carrier | Toner | External additive | | | | | Fog | | Carrier development | Texture | Image density | Cleaning |
|---|---|---|---|---|---|---|---|---|---|---|---|---|---|---|
| | | | | Small-diameter silica | | Large-diameter silica | | | | | | | | |
| | | | | Diameter [nm] | Amount [part] | Type | Diameter [nm] | Amount [part] | FD | Rating | | | | |
| Example 17 | A-17 | CA-17 | TA-17 | 20 | 1.5 | S5 | 120 | 0.4 | 0.008 | A | A | A | A | B |
| Example 18 | A-18 | CA-18 | TA-18 | 20 | 1.5 | S5 | 120 | 0.7 | 0.009 | A | A | B | A | A |
| Comparative Example 1 | B-1 | CB-1 | TB-1 | 20 | 1.5 | S2 | 60 | 0.7 | 0.022 | C (NG) | A | A | D (NG) | A |
| Comparative Example 2 | B-2 | CB-2 | TB-2 | 20 | 1.5 | S2 | 60 | 0.7 | 0.024 | C (NG) | A | A | A | A |
| Comparative Example 3 | B-3 | CB-3 | TB-3 | 20 | 1.5 | S2 | 60 | 0.7 | 0.023 | C (NG) | C | A | D (NG) | A |
| Comparative Example 4 | B-4 | CB-4 | TB-4 | 20 | 1.5 | S2 | 60 | 0.7 | 0.007 | A | A | B | A | D (NG) |
| Example 19 | A-19 | CA-19 | TA-19 | 20 | 1.5 | S2 | 60 | 0.7 | 0.013 | B | A | A | B | B |

TABLE 10

| | Developer | Carrier | Toner | External additive | | | | | Fog | | Carrier development | Texture | Image density | Cleaning |
|---|---|---|---|---|---|---|---|---|---|---|---|---|---|---|
| | | | | Small-diameter silica | | Large-diameter silica | | | | | | | | |
| | | | | Diameter [nm] | Amount [part] | Type | Diameter [nm] | Amount [part] | FD | Rating | | | | |
| Example 20 | A-20 | CA-20 | TA-20 | 20 | 1.5 | S2 | 60 | 0.7 | 0.014 | B | A | A | B | B |
| Example 21 | A-21 | CA-21 | TA-21 | 20 | 1.5 | S2 | 60 | 0.7 | 0.012 | B | A | A | B | B |
| Example 22 | A-22 | CA-22 | TA-22 | 20 | 1.5 | S2 | 60 | 0.7 | 0.018 | B | A | A | B | B |
| Comparative Example 5 | B-5 | CB-5 | TB-5 | 20 | 1.5 | — | — | — | 0.026 | C (NG) | A | C | C | A |
| Example 23 | A-23 | CA-23 | TA-23 | 20 | 1.5 | S2 | 60 | 0.7 | 0.014 | B | A | A | B | B |
| Comparative Example 6 | B-6 | CB-6 | TB-6 | 20 | 1.5 | S2 | 60 | 0.7 | 0.022 | C (NG) | A | B | B | A |
| Comparative Example 7 | B-7 | CB-7 | TB-7 | 20 | 1.5 | S2 | 60 | 0.7 | 0.031 | C (NG) | D (NG) | B | B | A |
| Comparative Example 8 | B-8 | CB-8 | TB-8 | 20 | 1.5 | S6 | 150 | 0.7 | 0.033 | C (NG) | A | C | D (NG) | A |

TABLE 11

| | Start (Sheet number) | | | | | | | |
|---|---|---|---|---|---|---|---|---|
| | 1 | 5,001 | 10,001 | 15,001 | 15,101 | 20,001 | 20,501 | 25,001 |
| Image evaluation timing (Sheet number) | 5,000 | 10,000 | 15,000 | 15,100 | 20,000 | 20,500 | 25,000 | 30,000 |
| Environment | NN | NN | NN | NN | NN | NN | NN | NN |
| Mode | Consecutive | Consecutive | Consecutive | Consecutive | Consecutive | Consecutive | Consecutive | 5-sheet intermittent |
| Printing rate | 5% | 5% | 2% | 50% | 2% | 20% | 5% | 5% |
| | Start (Sheet number) | | | | | | | |
| | 30,001 | 35,001 | 35,101 | 40,001 | 45,001 | 50,001 | 50,101 | 55,001 |
| Image evaluation timing (Sheet number) | 35,000 | 35,100 | 40,000 | 45,000 | 50,000 | 50,100 | 55,000 | 55,500 |
| Environment | NN | NN | NN | HH | HH | HH | HH | HH |
| Mode | 5-sheet intermittent | 5-sheet intermittent | 5-sheet intermittent | Consecutive | Consecutive | Consecutive | Consecutive | Consecutive |
| Printing rate | 2% | 50% | 5% | 5% | 2% | 50% | 5% | 20% |

TABLE 11-continued

| | Start (Sheet number) | | | | | | | |
|---|---|---|---|---|---|---|---|---|
| | 55,501 | 60,001 | 60,101 | 65,001 | 70,001 | 70,501 | 75,001 | 75,101 |
| Image evaluation timing (Sheet number) | 60,000 | 60,100 | 65,000 | 70,000 | 70,500 | 75,000 | 75,100 | 80,000 |
| Environment | HH | HH | HH | LL | LL | LL | LL | LL |
| Mode | 5-sheet intermittent | 5-sheet intermittent | 5-sheet intermittent | Consecutive | Consecutive | 5-sheet intermittent | 5-sheet intermittent | 5-sheet intermittent |
| Printing rate | 2% | 50% | 5% | 2% | 50% | 2% | 50% | 5% |

| | Start (Sheet number) | | | | | |
|---|---|---|---|---|---|---|
| | 80,001 | 85,001 | 85,101 | 90,001 | 90,101 | 95,001 |
| Image evaluation timing (Sheet number) | 85,000 | 85,100 | 90,000 | 90,100 | 95,000 | 100,000 |
| Environment | NN | NN | NN | NN | NN | NN |
| Mode | Consecutive | Consecutive | intermittent | intermittent | Consecutive | 5-sheet intermittent |
| Printing rate | 2% | 50% | 2% | 50% | 2% | 2% |

As shown in Table 5, the content of the barium titanate particles of the carrier particles contained in the carrier (CB-1) of the developer (B-1) was less than 5 parts by mass relative to 100 parts by mass of the coating resin. As shown in Table 9, the evaluation results of fog resistance and image density for the developer (B-1) were both rated as poor and determined to be failed.

As shown in Table 5, the content of the barium titanate particles of the carrier particles contained in the carrier (CB-2) of the developer (B-2) was greater than 45 parts by mass relative to 100 parts by mass of the coating resin. As shown in Table 9, the evaluation result of fog resistance for the developer (B-2) was rated as poor and determined to be failed.

As shown in Table 5, the number average primary particle diameter of the barium titanate particles of the carrier particles contained in the carrier (CB-3) of the developer (B-3) was less than 100 nm. As shown in Table 9, the evaluation results of fog resistance and image density for the developer (B-3) were both rated as poor and determined to be failed.

As shown in Table 5, the number average primary particle diameter of the barium titanate particles of the carrier particles contained in the carrier (CB-4) of the developer (B-4) was greater than 500 nm. As shown in Table 9, the evaluation result of inhibition of occurrence of image defects resulting from cleaning failure for the developer (B-4) was rated as poor and determined to be failed.

As shown in Table 10, the external additive particles of the toner particles contained in the toner (TB-5) of the developer (B-5) included no large-diameter silica particles. The external additive particles of the toner particles contained in the toner (TB-5) included small-diameter silica particles with a number average primary particle diameter of less than 300 nm. As shown in Table 10, the evaluation result of fog resistance for the developer (B-5) was rated as poor and determined to be failed.

As shown in Table 6, the coat layer/core rate of the carrier particles contained in the carrier (CB-6) of the developer (B-6) was greater than 4.90% by mass, and the coverage rate of the carrier cores was 100.0%. As shown in Table 10, the evaluation result of the fog resistance for the developer (B-6) was rated as poor and determined to be failed.

As shown in Table 6, the coat layer/core rate of the carrier particles contained in the carrier (CB-7) of the developer (B-7) was less than 0.09% by mass, and the coverage rate of the carrier cores was less than 80.0%. As shown in Table 10, the evaluation results of fog resistance and inhibition of occurrence of carrier development for the developer (B-7) were both rated as poor and determined to be failed.

As shown in Table 10, the external additive particles included in the toner particles contained in the toner (TB-8) of the developer (B-8) included the small-diameter silica particles and the ultra-large-diameter silica particles (S6). The number average primary particle diameter of the small-diameter silica particles was less than 30 nm. The number average primary particle diameter of the ultra-large-diameter silica particles (S6) was greater than 120 nm. As shown in Table 10, the evaluation results of fog resistance and image density for the developer (B-8) were both rated as poor and determined to be failed.

As shown in Tables 3 to 10, each of the developers (A-1) to (A-23) had the following features. That is, the external additive particles of the toner particles included large-diameter silica particles. The coat layers of the carrier particles contained barium titanate particles and a coating resin including a silicone resin. The barium titanate particles had a number average primary particle diameter of at least 100 nm and no greater than 500 nm. The barium titanate particles had a content of at least 5 parts by mass and no greater than 45 parts by mass relative to 100 parts by mass of the coating resin. The coat layer/core rate was at least 0.09% by mass and no greater than 4.90% by mass. The coverage rate of the carrier cores was at least 80.0% and less than 100.0%. As shown in Tables 7 to 10, all of the evaluation results of fog resistance, the evaluation results of image density, and the evaluation results of inhibition of occurrence of image defects resulting from cleaning failure for the developers (A-1) to (A-23) were determined to be passed. As shown in Tables 7 to 10, the evaluation results of inhibition of decrease in texture for the developers (A-1) to (A-23) were also determined to be passed.

From the above, it was demonstrated that the developer of the present invention, which encompasses the developers (A-1) to (A-23), can contribute to excellent fog resistance, stable formation of images with desired image density, and inhibition of occurrence of carrier development and image defects resulting from cleaning failure.

INDUSTRIAL APPLICABILITY

The developer according to the present invention can be used for image formation in copiers, printers, and multifunction peripherals, for example.

The invention claimed is:

1. A two-component developer comprising:

a toner containing toner particles; and a carrier containing carrier particles, wherein the toner particles each include a toner mother particle and external additive particles provided on a surface of the toner mother particle, the external additive particles include silica particles, the silica particles have a number average primary particle diameter of at least 30 nm and no greater than 120 nm, the carrier particles each include a carrier core and a coat layer covering a surface of the carrier core, the coat layers contain a coating resin and barium titanate particles, the coating resin includes a silicone resin, the barium titanate particles have a number average primary particle diameter of at least 100 nm and no greater than 500 nm, the barium titanate particles have a content of at least 5 parts by mass and no greater than 45 parts by mass relative to 100 parts by mass of the coating resin, a rate of a mass of the coat layers to a mass of the carrier cores is at least 0.09% by mass and no greater than 4.90% by mass, and a coverage rate of the carrier cores is at least 80.0% and less than 100.0%, the coverage rate being a rate of an area of covered regions of the carrier cores covered with the coat layers to an area of the surfaces of the carrier cores.

2. The two-component developer according to claim 1, wherein a ratio of the coverage rate to a shape factor of the carrier particles is at least 1.9 and no greater than 11.5.

3. The two-component developer according to claim 1, wherein the content of the barium titanate particles is at least 25 parts by mass and no greater than 45 parts by mass relative to 100 parts by mass of the coating resin.

4. The two-component developer according to claim 1, wherein the carrier cores have a saturation magnetization of at least 65 emu/g and no greater than 90 emu/g.

5. The two-component developer according to claim 1, wherein the carrier cores have a volume median diameter of at least 20.0 μm and no greater than 60.0 μm.

6. The two-component developer according to claim 1, wherein the coat layers further contain carbon black particles.

7. The two-component developer according to claim 1, wherein the rate of the mass of the coat layers to the mass of the carrier cores is at least 0.05% by mass and no greater than 4.00% by mass.

8. The two-component developer according to claim 1, wherein the carrier particles have a BET specific surface area of at least 0.3 $m^2/g$ and no greater than 3.0 $m^2/g$.

* * * * *